US012652621B2

(12) United States Patent
Li et al.

(10) Patent No.: US 12,652,621 B2
(45) Date of Patent: Jun. 9, 2026

(54) eUICC ACCESS WITHOUT BASEBAND WIRELESS SUPPORT

(71) Applicant: Apple Inc., Cupertino, CA (US)

(72) Inventors: Li Li, Los Altos, CA (US); Abishek Kumar Vaidyanathan, Union City, CA (US); Nicholas M. Beckmann, San Diego, CA (US); Anish Kumar Goyal, Fremont, CA (US); Veerababu Manam, Tracy, CA (US)

(73) Assignee: Apple Inc., Cupertino, CA (US)

( * ) Notice: Subject to any disclaimer, the term of this patent is extended or adjusted under 35 U.S.C. 154(b) by 738 days.

(21) Appl. No.: 18/065,607

(22) Filed: Dec. 13, 2022

(65) Prior Publication Data

US 2023/0199662 A1 Jun. 22, 2023

Related U.S. Application Data

(60) Provisional application No. 63/265,769, filed on Dec. 20, 2021.

(51) Int. Cl.
*H04W 52/02* (2009.01)
*H04W 4/60* (2018.01)

(52) U.S. Cl.
CPC ..... *H04W 52/028* (2013.01); *H04W 52/0264* (2013.01); *H04W 4/60* (2018.02)

(58) Field of Classification Search
CPC ........... H04W 52/028; H04W 52/0264; H04W 4/60
See application file for complete search history.

(56) References Cited

U.S. PATENT DOCUMENTS

| | | | | |
|---|---|---|---|---|
| 9,439,062 | B2 * | 9/2016 | Li | H04W 12/45 |
| 9,510,186 | B2 * | 11/2016 | Li | H04W 12/35 |
| 9,736,678 | B2 * | 8/2017 | Li | G06F 3/0637 |
| 10,187,788 | B2 * | 1/2019 | Yang | G06F 3/0604 |
| 10,440,034 | B2 * | 10/2019 | Hauck | H04W 8/205 |
| 11,039,297 | B1 * | 6/2021 | Desai | H04L 65/65 |
| 2015/0350983 | A1 * | 12/2015 | Kwok | H04W 36/247 |
| | | | | 370/331 |
| 2016/0057624 | A1 * | 2/2016 | Yang | H04W 4/60 |
| | | | | 455/411 |
| 2019/0098487 | A1 * | 3/2019 | Boettger | H04W 8/183 |

(Continued)

*Primary Examiner* — Mounir Moutaouakil
(74) *Attorney, Agent, or Firm* — DICKINSON WRIGHT RLLP

(57) ABSTRACT

Embodiments described herein relate to managing access to an embedded universal integrated circuit card (eUICC) to obtain subscriber identity module (SIM) information without requiring cellular baseband wireless processing support. A baseband component of a wireless device that connects to the eUICC via a first interface can be in a reduced power state, and under certain conditions a processor external to the eUICC can access the eUICC via a second interface without booting up the baseband component to a normal (full) power state. When access to the eUICC via the first interface through the baseband component is required, the baseband component can be booted to a normal (full) power state to communicate with the eUICC. Additionally, a wireless device in which the baseband component is in a reduced power state or is absent can access one or more services of a mobile network operator (MNO) via a non-cellular wireless interface.

20 Claims, 15 Drawing Sheets eUICC Access Architecture

300

(56)  References Cited

U.S. PATENT DOCUMENTS

| | | | |
|---|---|---|---|
| 2021/0058774 A1* | 2/2021 | Yang | H04W 12/086 |
| 2021/0160684 A1* | 5/2021 | Lee | H04L 67/02 |
| 2022/0124481 A1* | 4/2022 | Kang | H04W 12/45 |
| 2022/0141642 A1* | 5/2022 | Boyapalle | H04W 8/18 |
| | | | 455/418 |
| 2022/0159448 A1* | 5/2022 | Kang | H04W 8/22 |

* cited by examiner

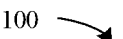
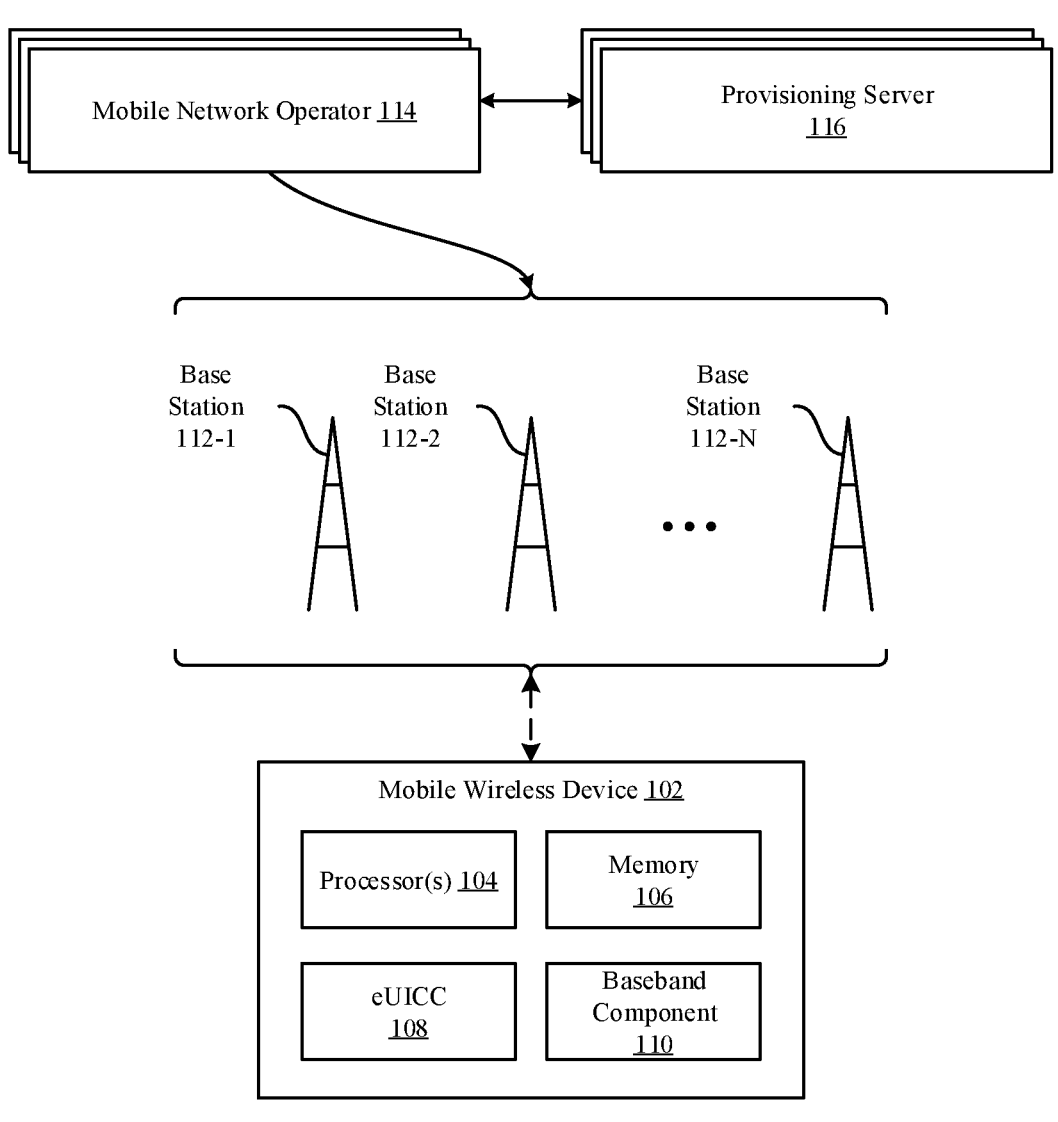
*FIG. 1*

200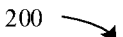
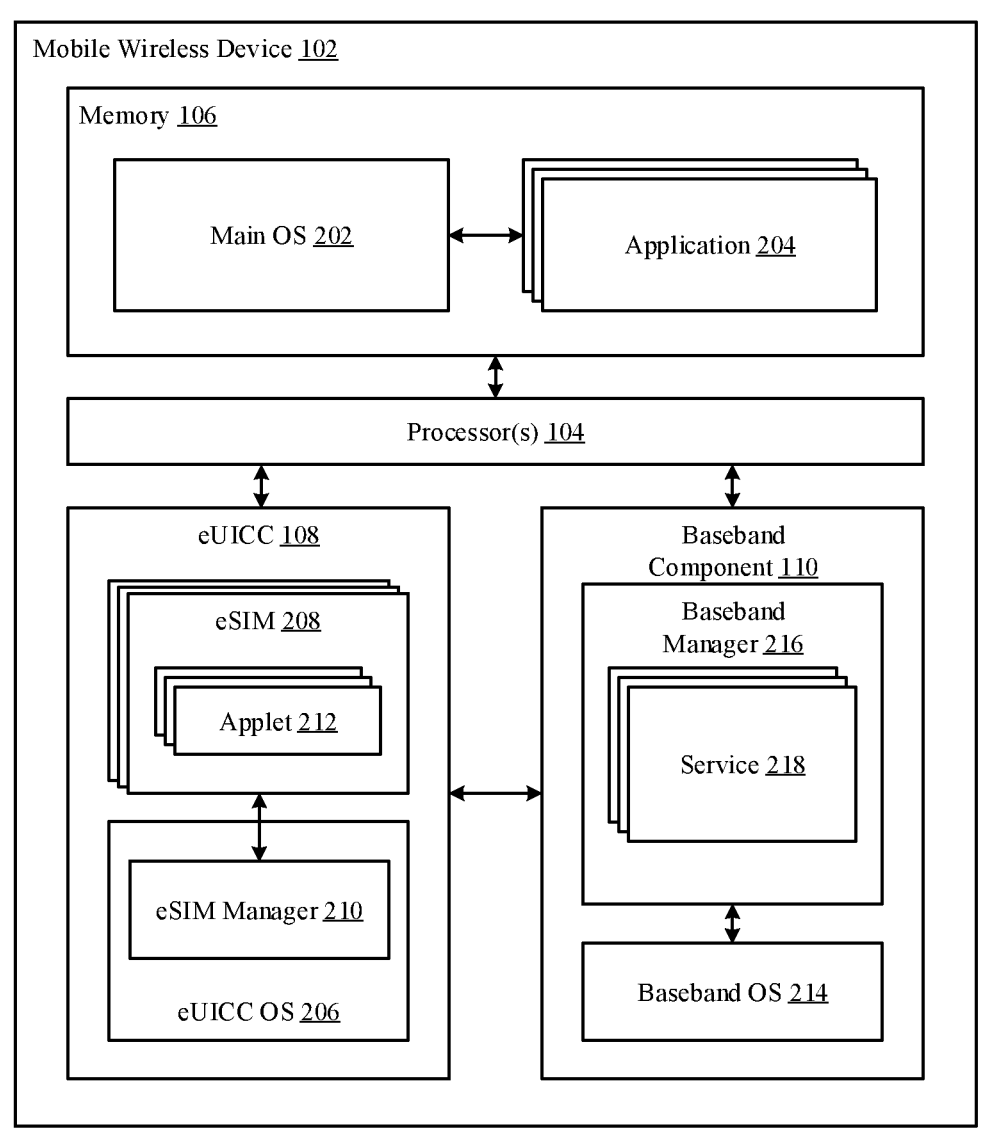
*FIG. 2* eUICC Access Architecture

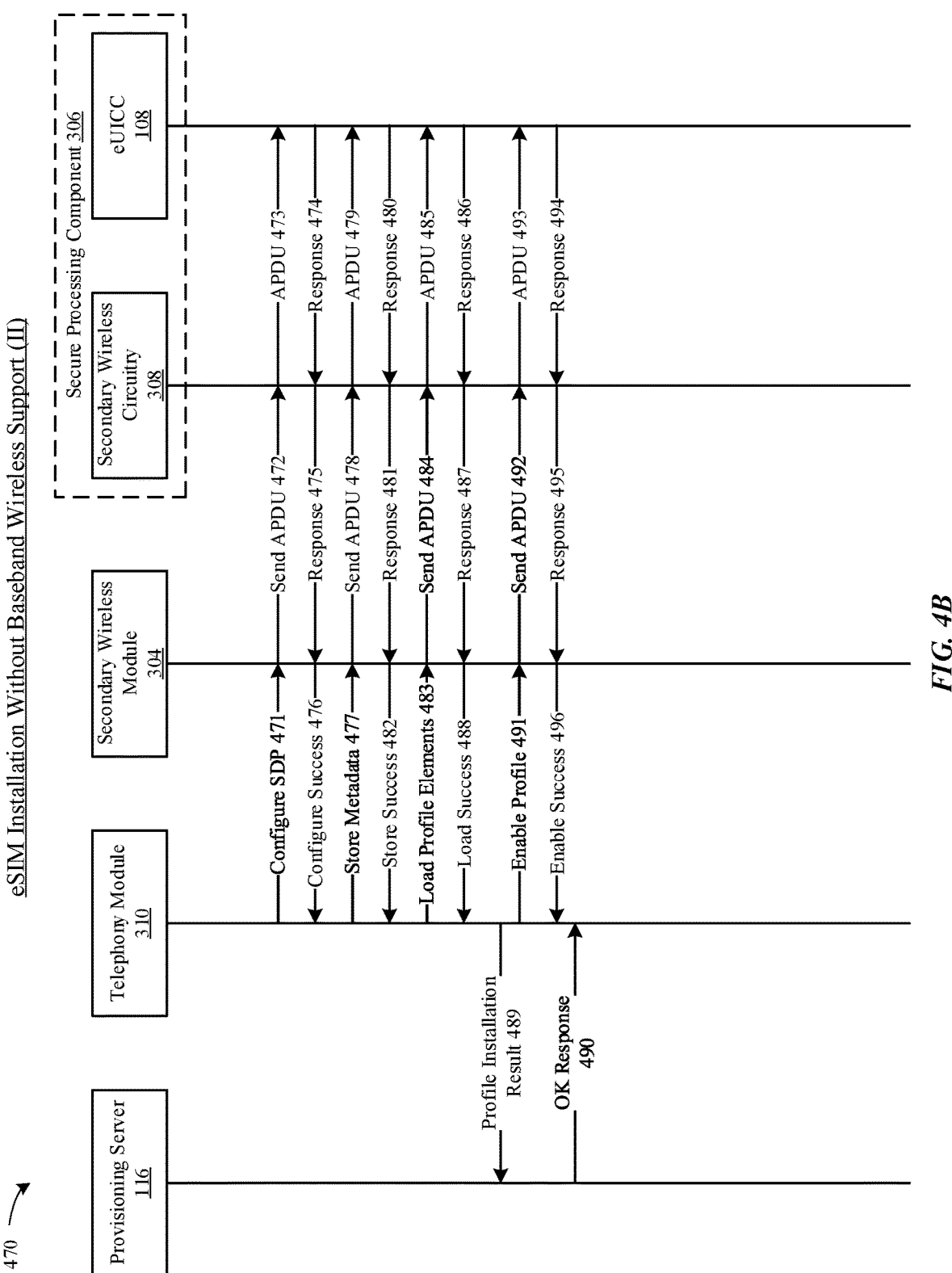

eSIM Installation Without Baseband Wireless Support (II)

Secure Processing Component 306 eUICC 108

Secondary Wireless Circuitry 308

Secondary Wireless Module 304

Telephony Module 310

Provisioning Server 116

Configure SDP 471

Send APDU 472

APDU 473

Response 474

Response 475

Configure Success 476

Store Metadata 477

Send APDU 478

APDU 479

Response 480

Response 481

Store Success 482

Load Profile Elements 483

Send APDU 484

APDU 485

Response 486

Response 487

Load Success 488

Profile Installation Result 489

OK Response 490

Enable Profile 491

Send APDU 492

APDU 493

Response 494

Response 495

Enable Success 496

Figure 7:
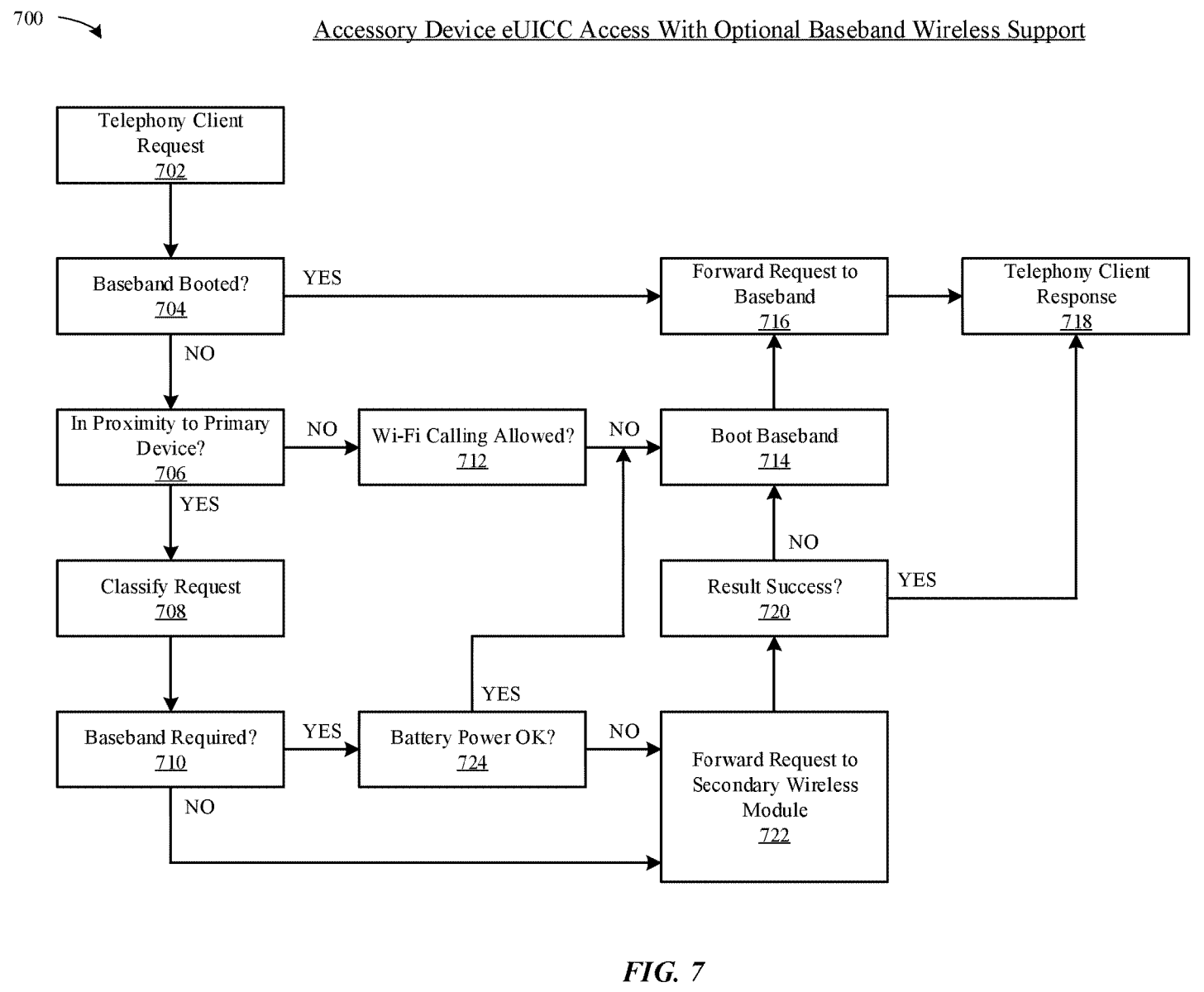

Accessory Device eUICC Access With Optional Baseband Wireless Support

700

Telephony Client Request 702

Baseband Booted? 704

In Proximity to Primary Device? 706

Classify Request 708

Baseband Required? 710

Wi-Fi Calling Allowed? 712

Battery Power OK? 724

Boot Baseband 714

Forward Request to Baseband 716

Result Success? 720

Forward Request to Secondary Wireless Module 722

Telephony Client Response 718

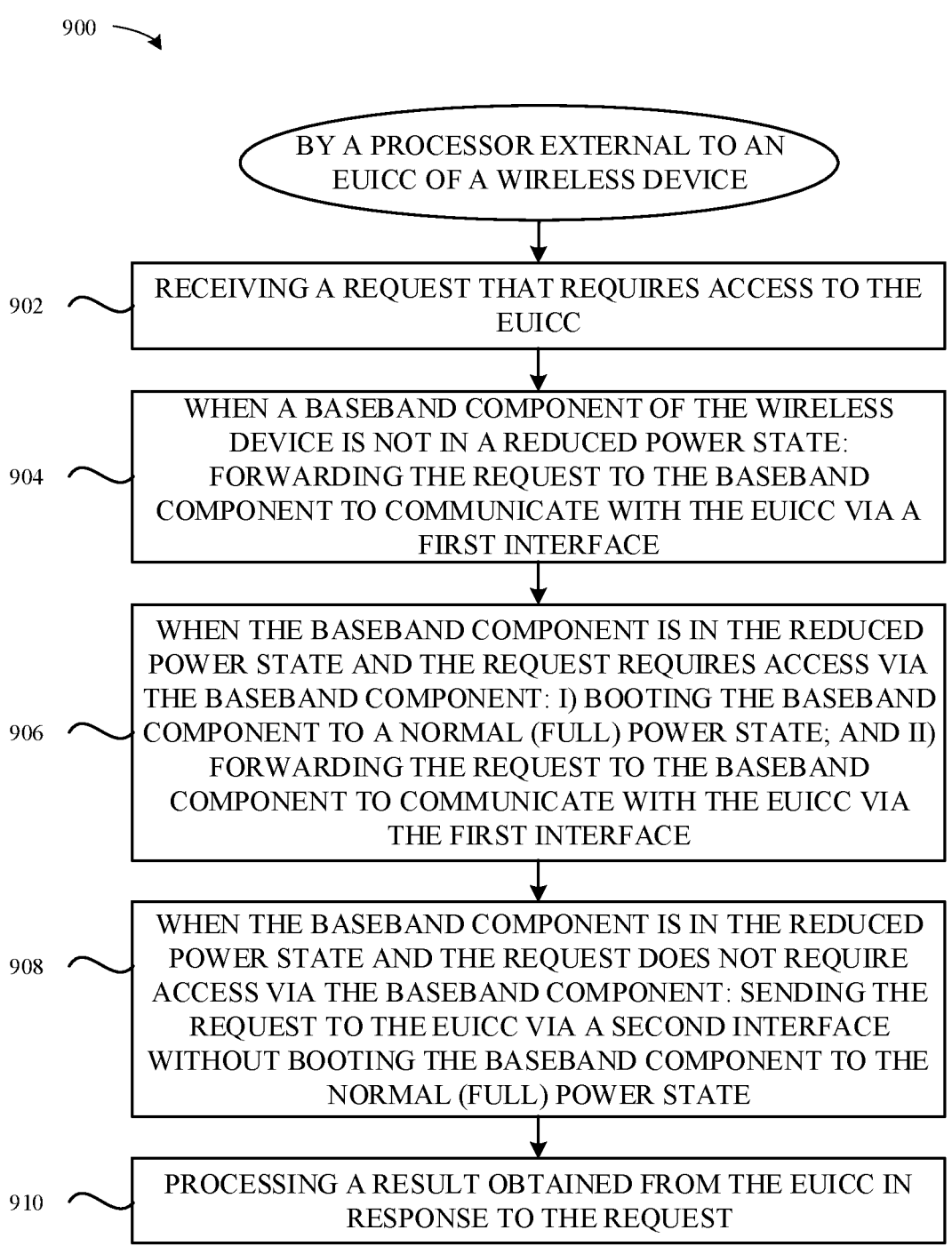

902 — RECEIVING A REQUEST THAT REQUIRES ACCESS TO THE EUICC

904 — WHEN A BASEBAND COMPONENT OF THE WIRELESS DEVICE IS NOT IN A REDUCED POWER STATE: FORWARDING THE REQUEST TO THE BASEBAND COMPONENT TO COMMUNICATE WITH THE EUICC VIA A FIRST INTERFACE

906 — WHEN THE BASEBAND COMPONENT IS IN THE REDUCED POWER STATE AND THE REQUEST REQUIRES ACCESS VIA THE BASEBAND COMPONENT: I) BOOTING THE BASEBAND COMPONENT TO A NORMAL (FULL) POWER STATE; AND II) FORWARDING THE REQUEST TO THE BASEBAND COMPONENT TO COMMUNICATE WITH THE EUICC VIA THE FIRST INTERFACE

908 — WHEN THE BASEBAND COMPONENT IS IN THE REDUCED POWER STATE AND THE REQUEST DOES NOT REQUIRE ACCESS VIA THE BASEBAND COMPONENT: SENDING THE REQUEST TO THE EUICC VIA A SECOND INTERFACE WITHOUT BOOTING THE BASEBAND COMPONENT TO THE NORMAL (FULL) POWER STATE

910 — PROCESSING A RESULT OBTAINED FROM THE EUICC IN RESPONSE TO THE REQUEST

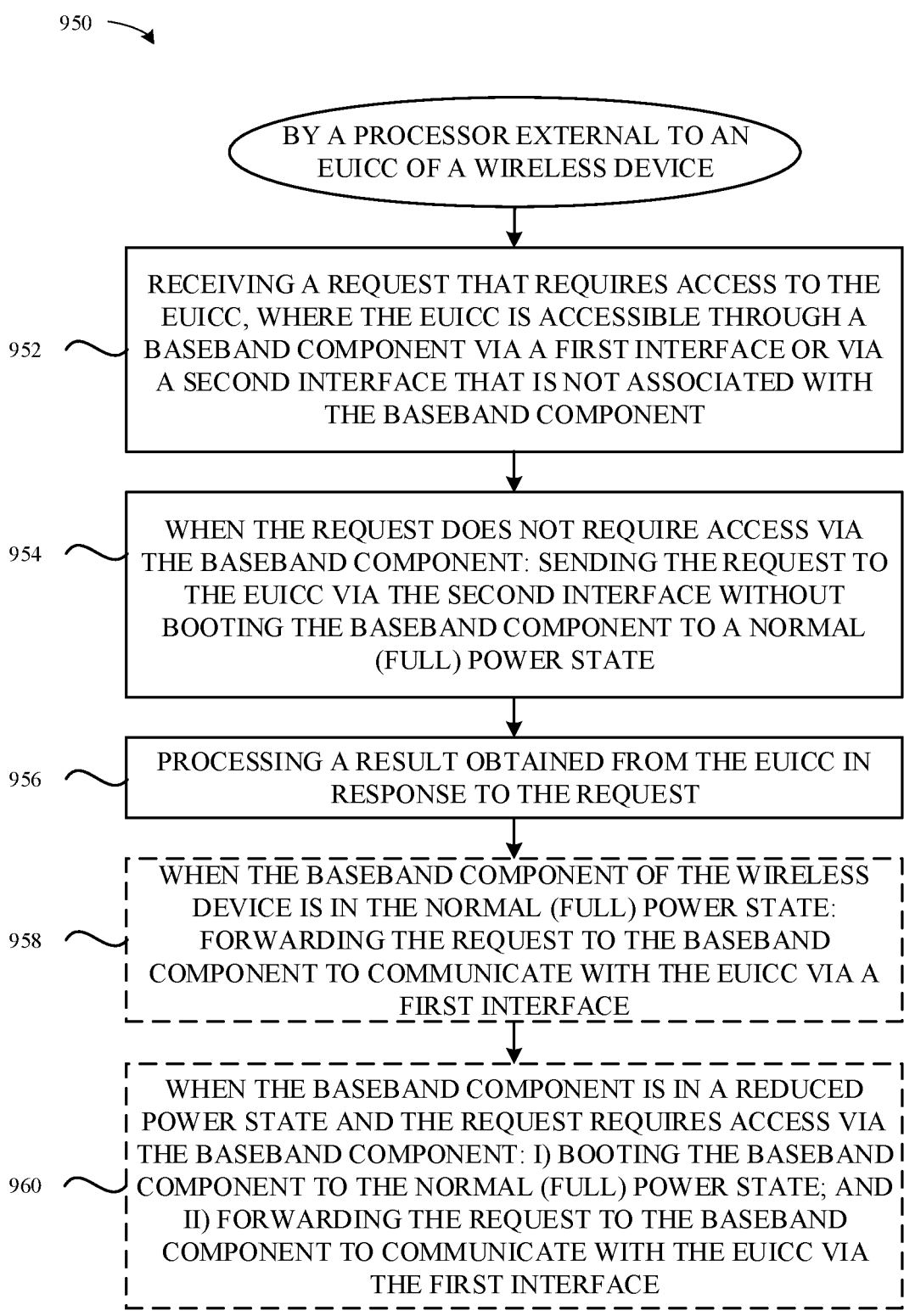

BY A PROCESSOR EXTERNAL TO AN EUICC OF A WIRELESS DEVICE

952 — RECEIVING A REQUEST THAT REQUIRES ACCESS TO THE EUICC, WHERE THE EUICC IS ACCESSIBLE THROUGH A BASEBAND COMPONENT VIA A FIRST INTERFACE OR VIA A SECOND INTERFACE THAT IS NOT ASSOCIATED WITH THE BASEBAND COMPONENT

954 — WHEN THE REQUEST DOES NOT REQUIRE ACCESS VIA THE BASEBAND COMPONENT: SENDING THE REQUEST TO THE EUICC VIA THE SECOND INTERFACE WITHOUT BOOTING THE BASEBAND COMPONENT TO A NORMAL (FULL) POWER STATE

956 — PROCESSING A RESULT OBTAINED FROM THE EUICC IN RESPONSE TO THE REQUEST

958 — WHEN THE BASEBAND COMPONENT OF THE WIRELESS DEVICE IS IN THE NORMAL (FULL) POWER STATE: FORWARDING THE REQUEST TO THE BASEBAND COMPONENT TO COMMUNICATE WITH THE EUICC VIA A FIRST INTERFACE

960 — WHEN THE BASEBAND COMPONENT IS IN A REDUCED POWER STATE AND THE REQUEST REQUIRES ACCESS VIA THE BASEBAND COMPONENT: I) BOOTING THE BASEBAND COMPONENT TO THE NORMAL (FULL) POWER STATE; AND II) FORWARDING THE REQUEST TO THE BASEBAND COMPONENT TO COMMUNICATE WITH THE EUICC VIA THE FIRST INTERFACE

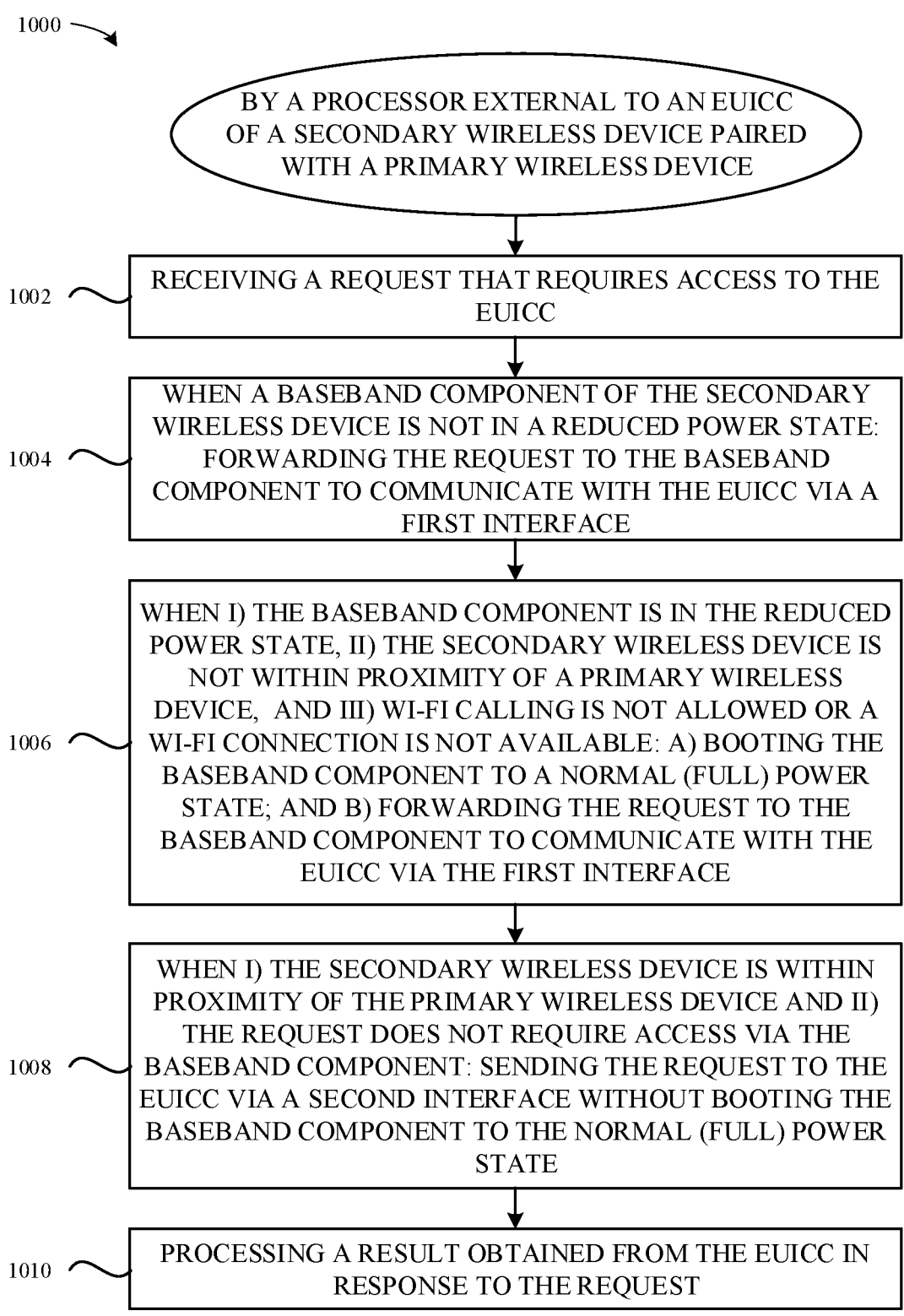

BY A PROCESSOR EXTERNAL TO AN EUICC OF A SECONDARY WIRELESS DEVICE PAIRED WITH A PRIMARY WIRELESS DEVICE

1002 — RECEIVING A REQUEST THAT REQUIRES ACCESS TO THE EUICC

1004 — WHEN A BASEBAND COMPONENT OF THE SECONDARY WIRELESS DEVICE IS NOT IN A REDUCED POWER STATE: FORWARDING THE REQUEST TO THE BASEBAND COMPONENT TO COMMUNICATE WITH THE EUICC VIA A FIRST INTERFACE

1006 — WHEN I) THE BASEBAND COMPONENT IS IN THE REDUCED POWER STATE, II) THE SECONDARY WIRELESS DEVICE IS NOT WITHIN PROXIMITY OF A PRIMARY WIRELESS DEVICE, AND III) WI-FI CALLING IS NOT ALLOWED OR A WI-FI CONNECTION IS NOT AVAILABLE: A) BOOTING THE BASEBAND COMPONENT TO A NORMAL (FULL) POWER STATE; AND B) FORWARDING THE REQUEST TO THE BASEBAND COMPONENT TO COMMUNICATE WITH THE EUICC VIA THE FIRST INTERFACE

1008 — WHEN I) THE SECONDARY WIRELESS DEVICE IS WITHIN PROXIMITY OF THE PRIMARY WIRELESS DEVICE AND II) THE REQUEST DOES NOT REQUIRE ACCESS VIA THE BASEBAND COMPONENT: SENDING THE REQUEST TO THE EUICC VIA A SECOND INTERFACE WITHOUT BOOTING THE BASEBAND COMPONENT TO THE NORMAL (FULL) POWER STATE

1010 — PROCESSING A RESULT OBTAINED FROM THE EUICC IN RESPONSE TO THE REQUEST

*FIG. 10A*

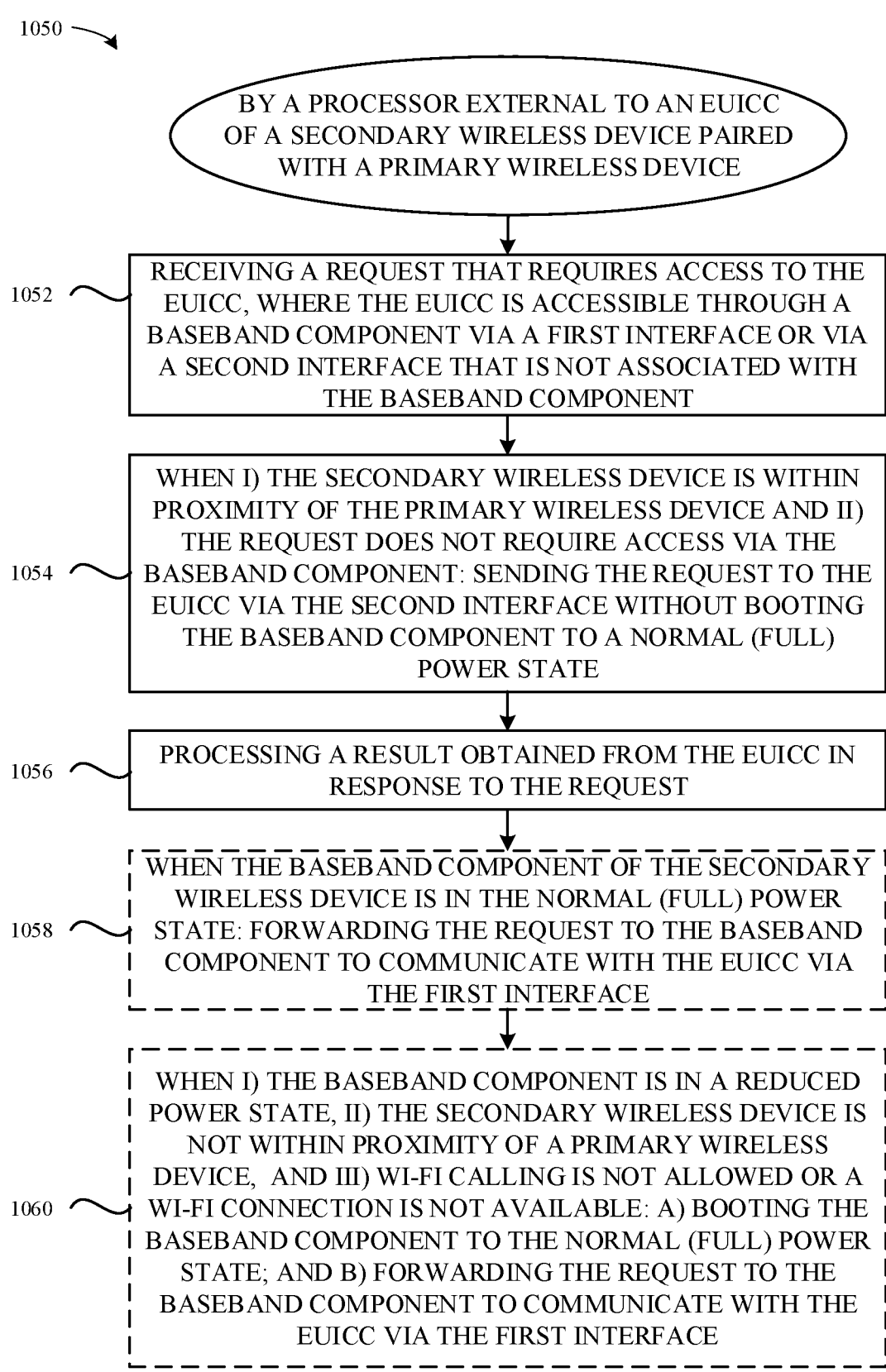

1050

BY A PROCESSOR EXTERNAL TO AN EUICC OF A SECONDARY WIRELESS DEVICE PAIRED WITH A PRIMARY WIRELESS DEVICE

1052 — RECEIVING A REQUEST THAT REQUIRES ACCESS TO THE EUICC, WHERE THE EUICC IS ACCESSIBLE THROUGH A BASEBAND COMPONENT VIA A FIRST INTERFACE OR VIA A SECOND INTERFACE THAT IS NOT ASSOCIATED WITH THE BASEBAND COMPONENT

1054 — WHEN I) THE SECONDARY WIRELESS DEVICE IS WITHIN PROXIMITY OF THE PRIMARY WIRELESS DEVICE AND II) THE REQUEST DOES NOT REQUIRE ACCESS VIA THE BASEBAND COMPONENT: SENDING THE REQUEST TO THE EUICC VIA THE SECOND INTERFACE WITHOUT BOOTING THE BASEBAND COMPONENT TO A NORMAL (FULL) POWER STATE

1056 — PROCESSING A RESULT OBTAINED FROM THE EUICC IN RESPONSE TO THE REQUEST

1058 — WHEN THE BASEBAND COMPONENT OF THE SECONDARY WIRELESS DEVICE IS IN THE NORMAL (FULL) POWER STATE: FORWARDING THE REQUEST TO THE BASEBAND COMPONENT TO COMMUNICATE WITH THE EUICC VIA THE FIRST INTERFACE

1060 — WHEN I) THE BASEBAND COMPONENT IS IN A REDUCED POWER STATE, II) THE SECONDARY WIRELESS DEVICE IS NOT WITHIN PROXIMITY OF A PRIMARY WIRELESS DEVICE, AND III) WI-FI CALLING IS NOT ALLOWED OR A WI-FI CONNECTION IS NOT AVAILABLE: A) BOOTING THE BASEBAND COMPONENT TO THE NORMAL (FULL) POWER STATE; AND B) FORWARDING THE REQUEST TO THE BASEBAND COMPONENT TO COMMUNICATE WITH THE EUICC VIA THE FIRST INTERFACE

*FIG. 10B*

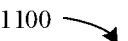
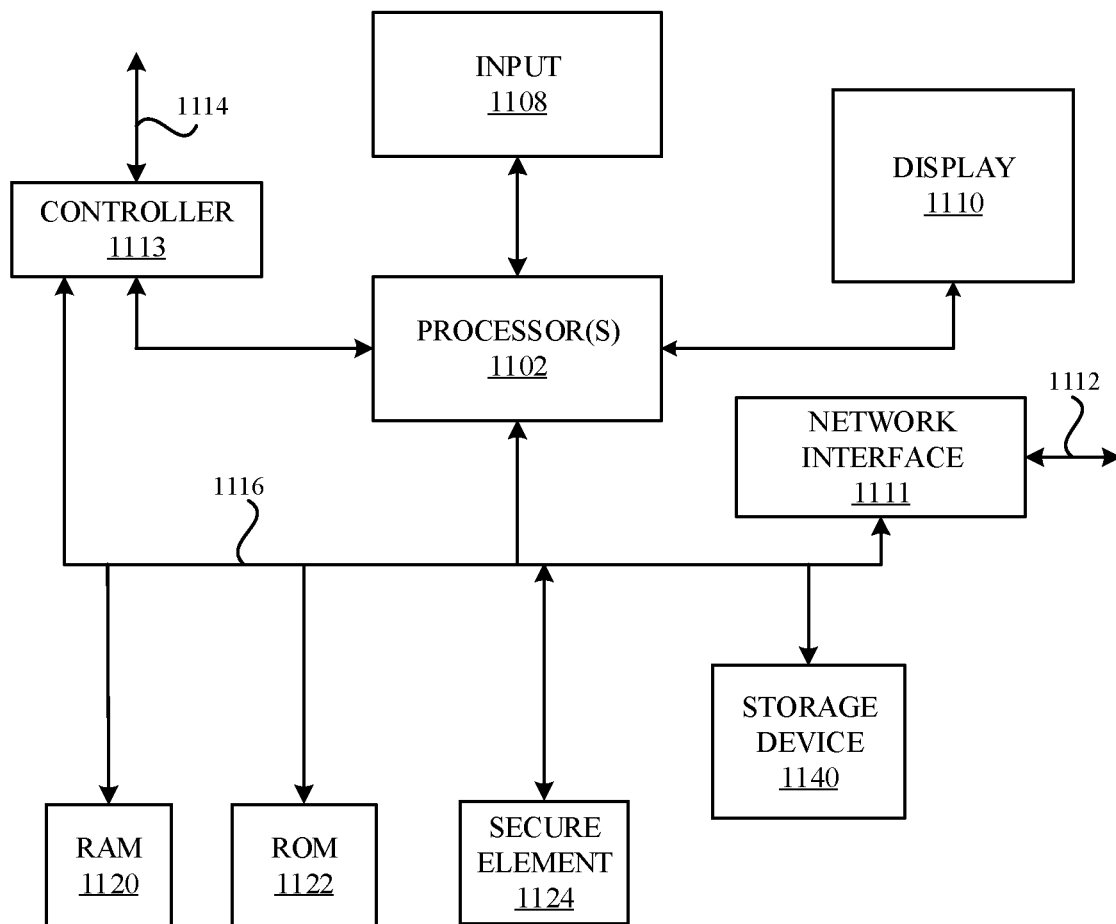
*FIG. 11* eUICC ACCESS WITHOUT BASEBAND WIRELESS SUPPORT

CROSS-REFERENCE TO RELATED APPLICATIONS

The present application claims the benefit of U.S. Provisional Application No. 63/265,769, entitled "EUICC ACCESS WITHOUT BASEBAND WIRELESS SUPPORT," filed Dec. 20, 2021, the content of which is incorporated by reference herein in its entirety for all purposes.

FIELD

The described embodiments relate to wireless communications, including methods and apparatus for managing access to an embedded universal integrated circuit card (eUICC) to obtain subscriber identity module (SIM) information without requiring cellular baseband wireless processing support.

BACKGROUND

Newer generation, e.g., fourth generation (4G) and fifth generation (5G), cellular wireless networks that implement one or more $3^{rd}$ Generation Partnership Project (3GPP) Long Term Evolution (LTE), LTE Advanced (LTE-A), and 5G standards are rapidly being developed and deployed by mobile network operators (MNOs) worldwide. The newer cellular wireless networks provide a range of packet-based services, with 5G technology providing increased data throughput and lower latency connections that promise enhanced mobile broadband services for 5G-capable wireless devices. Wireless local area networks, such as Wi-Fi networks, additionally provide access to communication network services, including cellular based services, such as Wi-Fi calling. Cellular wireless capability also continues to be included into more electronic devices, including devices with limited battery storage capability, such as cellular-capable wearable devices. To limit battery consumption, cellular baseband wireless circuitry can be placed in a reduced power mode when not needed. Access to cellular services provided by an MNO, including access via a non-cellular wireless network such as Wi-Fi, by an electronic device can require access to cellular credentials and/or secure processing provided by a secure element (SE), such as by an embedded universal integrated circuit card (eUICC) included in the electronic device. In some architectures, access to the eUICC can be through a cellular baseband component, which can be in a reduced power state in some circumstances to conserve limited battery power. Booting the cellular baseband component to gain access to the eUICC can result in a delay to connect and access the cellular services and can also consume power in an electronic device with limited battery power available. Access to the eUICC without booting the baseband component can be desired. Additionally, in some architectures a cellular baseband component may be unavailable, such as in an Internet of Things (IoT) electronic device that can access the Internet via a non-cellular connection but does not include cellular baseband wireless circuitry. Access to some cellular services provided by an MNO can be desired to be added to such IoT (or other) electronic devices that do not include cellular baseband capabilities. There exists a need for mechanisms to manage access to an eUICC without cellular wireless baseband support.

SUMMARY

The described embodiments relate to wireless communications, including methods and apparatus for managing access to an eUICC to obtain subscriber identity module (SIM) information without requiring cellular baseband wireless processing support by a wireless device. Cellular credentials, such as included in one or more electronic SIMs (eSIMs) stored on an eUICC of the wireless device, and associated secure processing by the eUICC can be required for performing certain cellular operations, including when accessing cellular services of an MNO via a non-cellular wireless access, e.g., via a wireless local area network (WLAN), by the wireless device. Cryptographic processing by the eUICC, to provide challenges and/or responses as part of an authentication procedure, can require access to the eUICC, including when authenticating for Wi-Fi calling where cellular baseband wireless processing for cellular wireless network access is not otherwise required. Similarly, access to the eUICC can be required for obtaining information from (reading) and/or providing information to (writing, updating) one or more eSIM files. When a baseband component of a wireless device is in a reduced power state, booting up the baseband component to a full power state can be restricted to occur only when needed, in order to conserve limited battery power of the wireless device. Rather than accessing the eUICC via the baseband component, the wireless device can include an alternative interface by which the eUICC can be accessed and used for performing cryptographic operations and/or managing eSIM files on the eUICC. A telephony application running on a processor of the wireless device, e.g., an application processor, can interface with the eUICC through the alternative interface. In some embodiments, the wireless device includes a baseband component through which the eUICC is accessed via a first interface, when the baseband component is fully powered, and also includes a second interface through which the eUICC can be accessed when the baseband component is in a reduced power state. In some embodiments, the wireless device excludes a baseband component and accesses the eUICC via the alternative interface as a primary interface in order for the wireless device to access services of an MNO through a non-cellular wireless interface of the wireless device. In some embodiments, access to the eUICC can include management of eSIMs on the eUICC, such as retrieving eSIM/profile information, enabling eSIMs, reading files associated with eSIMs, selecting eSIMs for an application, updating eSIM files, sending and receiving cryptographic information, such as used for authentication procedures for access to services of an MNO. In some embodiments, the alternative interface to the eUICC is a system power management interface (SPMI) that provides a high-speed, low latency, serial bus interface between a processor external to the eUICC and the eUICC. In some embodiments, the alternative interface includes communication via near-field communication (NFC) processing and/or circuitry. In some embodiments, the eUICC and NFC circuitry are bundled together in an integrated circuit package. In some embodiments, credentials, such as an eSIM, for access to services of an MNO are installed in a wireless device that does not include a baseband component or baseband wireless circuitry. In some embodiments, the credentials are used for access to one or more MNO provided services via a non-cellular wireless access, such as via a Wi-Fi network. In some embodiments, a cellular-capable wireless accessory device maintains a baseband component in a reduced powered state and determines whether to fully power up the baseband component in response to a cellular wireless function requirement. In some embodiments, for an incoming or outgoing voice/video call, the cellular-capable wireless accessory device is paired with a primary cellular-capable wireless device and only fully powers up a baseband component of the accessory device when a non-cellular wireless connection is not supported, e.g., when Wi-Fi calling is not enabled, and a non-cellular wireless connection to communicate via the primary cellular-capable wireless device is not available. In some embodiments, a processor of a wireless device external to an eUICC classifies one or more telephony requests according to whether a baseband component is required to perform an associated function. Example functions for which the baseband component may be not required can include Wi-Fi calling authentication, eUICC/eSIM file access (including reading and writing), eSIM management (including installing, modifying, deleting), user database synchronization (such as for a user phonebook and/or user preferences). Example functions for which the baseband component may be required can include Internet Multimedia System (IMS) operations that require context and/or information from associated eSIMs and certain security sensitive cryptographic functions, such as personal identification number (PIN) validation. In some embodiments, when encountering a failure while attempting to access an eUICC via an alternative interface without the baseband component being fully powered, the wireless device can re-attempt accessing the eUICC via an interface between the baseband component and the eUICC with the baseband component fully powered. In some embodiments, determination whether to fully power a baseband component that is in a reduced powered state after encountering an error to access the eUICC via an alternative interface depends at least in part on a type of error status code returned.

Other aspects and advantages of the invention will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

FIG. 1 illustrates a block diagram of different components of an exemplary system configured to implement cellular service access and provisioning for a wireless device, according to some embodiments.

FIG. 2 illustrates a block diagram of a more detailed view of exemplary components of the system of FIG. 1, according to some embodiments.

FIGS. 4A and 4B illustrate block diagrams of an exemplary set of actions to install an eSIM to a secondary wireless device without support from a baseband component, according to some embodiments.

FIG. 7 illustrates a flowchart of an exemplary set of actions to access an eUICC of an accessory wireless device with optional support from a baseband component, according to some embodiments.

FIG. 9A illustrates a flowchart of an exemplary method performed by a processor of a wireless device to access an eUICC of the wireless device, according to some embodiments.

FIG. 9B illustrates a flowchart of another exemplary method performed by a processor of a wireless device to access an eUICC of the wireless device, according to some embodiments.

FIG. 10A illustrate a flowchart of an exemplary method performed by a processor of a secondary wireless device to access an eUICC of the secondary wireless device, according to some embodiments.

FIG. 10B illustrate a flowchart of another exemplary method performed by a processor of a secondary wireless device to access an eUICC of the secondary wireless device, according to some embodiments.

FIG. 11 illustrates a block diagram of exemplary elements of a wireless device, according to some embodiments.

DETAILED DESCRIPTION

Figure 3:
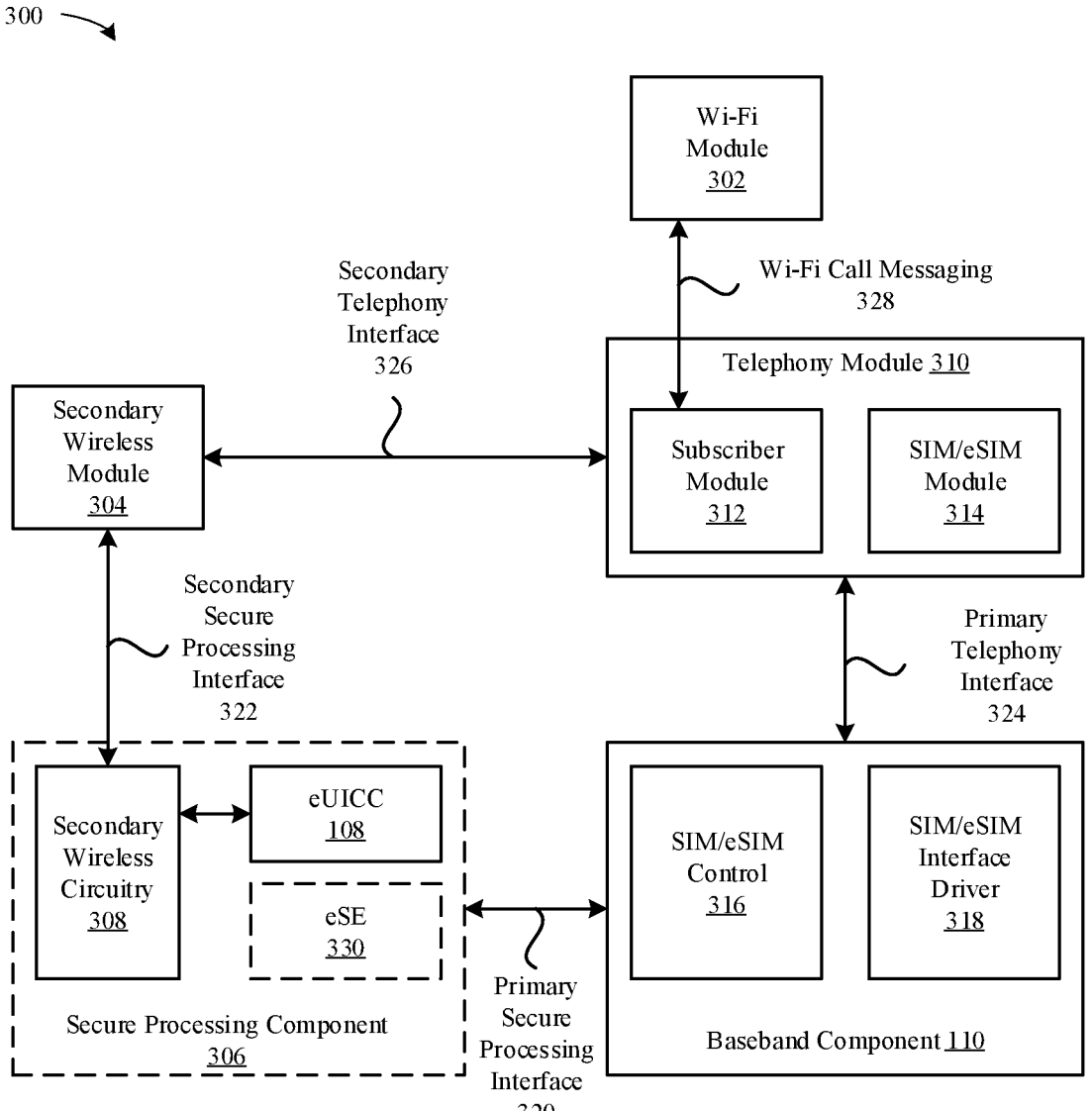
FIG. 3 illustrates a block diagram of an exemplary eUICC access architecture of a wireless device that includes a baseband component, according to some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

This application relates to wireless communications, including methods and apparatus for managing access to subscriber identity module (SIM) information and/or processing by an embedded UICC (eUICC) without requiring cellular wireless baseband processing support by a wireless device. In a wireless device that includes a baseband component, access to the eUICC can occur via the baseband component connected to the eUICC by a first interface when the baseband component is in a full power state. When the baseband component of the wireless device is in a reduced power state, under certain conditions access to the eUICC can occur via a second interface without powering up the baseband component, while in other conditions access to the eUICC can require booting the baseband component to a full power state and accessing the eUICC via the first interface. Access to cellular credentials, such as those included in one or more electronic SIMs (eSIMs) stored on the eUICC of the wireless device, and/or access to associated secure processing by the eUICC can be required for performing certain cellular operations, including when accessing cellular services of an MNO via a non-cellular wireless access, e.g., via a wireless local area network (WLAN), by the wireless device. Cryptographic processing by the eUICC, to provide challenges and/or responses as part of an authentication procedure, can also require access to the eUICC, including when authenticating for Wi-Fi calling where cellular baseband processing for cellular network access is not otherwise required. Similarly, access to the eUICC can be required for obtaining information from (reading) and/or providing information to (writing, updating) one or more eSIM files and/or eUICC files included in the eUICC.

When a baseband component of a wireless device is in a reduced power state, booting up the baseband component to a full power state can be restricted to occur only when needed, in order to conserve limited battery power of the wireless device. Some wireless devices, such as a wearable device, can have limited battery resources available and can prefer to maintain a baseband component of the wireless device in a reduced power state. Rather than accessing an eUICC of the wireless device via the baseband component, the wireless device can include an alternative interface by which the eUICC can be accessed and used for performing cryptographic operations and/or for managing eSIM files on the eUICC. A telephony application running on a processor of the wireless device that is external to the eUICC, e.g., an application processor, can interface with the eUICC through the alternative interface when the baseband component is in a reduced power state and access to the eUICC via the baseband component is not required. In some embodiments, the processor of the wireless device determines whether access to the eUICC can occur via the alternative interface rather than via an interface of the baseband component and uses the alternative interface when allowed and while the baseband component is in a powered reduced state in order to conserve battery power.

In some embodiments, the wireless device includes a baseband component through which the eUICC is accessed via a first interface when the baseband component is fully powered and also includes a second interface through which the eUICC can be accessed when the baseband component is in a reduced power state. In some embodiments, the wireless device excludes a baseband component and accesses the eUICC via the alternative interface as a primary interface in order for the wireless device to access services of an MNO through a non-cellular wireless interface of the wireless device. In some embodiments, access to the eUICC can include management of eSIMs on the eUICC, such as retrieving eSIM/profile information, enabling eSIMs, reading files associated with eSIMs, selecting eSIMs for an application, updating eSIM files, sending and receiving cryptographic information, such as used for authentication procedures for access to services of an MNO. In some embodiments, the alternative interface to the eUICC is a system power management interface (SPMI) that provides a high-speed, low latency, serial bus interface between a processor external to the eUICC and the eUICC. In some embodiments, the alternative interface includes communication through near-field communication (NFC) processing and/or circuitry. In some embodiments, the eUICC and NFC circuitry are bundled together in an integrated circuit package.

In some embodiments, credentials, such as an eSIM, for access to services of an MNO are installed in a wireless device that does not include a baseband component or baseband wireless circuitry. In some embodiments, the credentials are used for access to one or more cellular services via a non-cellular wireless access, such as via a Wi-Fi network. In some embodiments, a cellular-capable wireless accessory device maintains a baseband component in a reduced powered state and determines whether to fully power up the baseband component in response to a cellular wireless function requirement. In some embodiments, for an incoming or outgoing voice/video call, the cellular-capable wireless accessory device is paired with a primary cellular-capable wireless device and only fully powers up a baseband component of the accessory device when a non-cellular wireless connection is not supported, e.g., Wi-Fi calling not enabled, and a non-cellular wireless connection to communicate via the primary cellular-capable wireless device is not available.

In some embodiments, a processor of a wireless device external to an eUICC classifies one or more telephony requests according to whether a baseband component is required to perform an associated function. Example functions for which the baseband component may be not required can include Wi-Fi calling authentication, eUICC/eSIM file access (including reading and writing), eSIM management (including installing, modifying, deleting), user database synchronization (such as for a user phonebook and/or user preferences). Example functions for which the baseband component may be required can include Internet Multimedia System (IMS) operations that require context and/or information from associated eSIMs and certain security sensitive cryptographic functions, such as personal identification number (PIN) validation.

In some embodiments, when encountering a failure while attempting to access an eUICC via an alternative interface without the baseband component being fully powered, the wireless device can re-attempt accessing the eUICC via an interface between the baseband component and the eUICC with the baseband component fully powered. In some embodiments, determination whether to fully power a baseband component that is in a reduced powered state, after encountering an error to access the eUICC via an alternative interface, depends in part on a type of error status code returned. In some embodiments, a processor of the wireless device external to the eUICC determines whether to access the eUICC via the alternative interface or via the baseband component based on a battery status of the wireless device. In some embodiments, when the battery status of the wireless device is lower than a battery threshold, the processor of the wireless device attempts to access the eUICC via an alternative interface first, without using a baseband component of the wireless device, and subsequently attempts to access the eUICC via the first interface of the baseband component when receiving an error indication from the eUICC after attempting to access the eUICC via the alternative interface.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

These and other embodiments are discussed below with reference to FIGS. 1 through 11; however, those skilled in the art will readily appreciate that the detailed description given herein with respect to these figures is for explanatory purposes only and should not be construed as limiting.

FIG. 1 illustrates a block diagram of different components of a system 100 that includes i) a mobile wireless device 102, which can also be referred to as a wireless device, a wireless communication device, a mobile device, a user equipment (UE), a device, a primary wireless device, a secondary wireless device, an accessory wireless device, a cellular-capable wearable device, and the like, ii) a group of base stations 112-1 to 112-N, which are managed by different Mobile Network Operators (MNOs) 114, and iii) a set of provisioning servers 116 that are in communication with the MNOs 114. The mobile wireless device 102 can represent a mobile computing device (e.g., an iPhone®, an iPad®, or an Apple Watch® by Apple®), the base stations 112-1 to 112-N can represent cellular wireless network entities including fourth generation (4G) Long Term Evolution (LTE) evolved NodeBs (eNodeBs or eNBs) and/or fifth generation (5G) NodeBs (gNodeBs or gNBs) that are configured to communicate with the mobile wireless device 102, and the MNOs 114 can represent different wireless service providers that provide specific services (e.g., voice, data, video, messaging) to which a user of the mobile wireless device 102 can subscribe to access the services via the mobile wireless device 102. Applications resident on the mobile wireless device 102 can advantageously access services using 4G LTE connections and/or 5G connections via the base stations 112. The mobile wireless device 102 can include processing circuitry, which can include one or more processors 104 and a memory 106, an embedded Universal Integrated Circuit Card (eUICC) 108, and a baseband component 110. In some embodiments, the mobile wireless device 102 includes one or more physical UICCs, also referred to as Subscriber Identity Module (SIM) cards (not shown), in addition to the eUICC 108. The one or more processors 104 can include one or more wireless processors, such as a cellular baseband component, a wireless local area network processor, a wireless personal area network processor, a near-field communication processor, and one or more system-level application processors. The components of the mobile wireless device 102 work together to enable the mobile wireless device 102 to provide useful features to a user of the mobile wireless device 102, such as cellular wireless network access, non-cellular wireless network access, localized computing, location-based services, and Internet connectivity. The eUICC 108 can be configured to store multiple electronic SIMs (eSIMs) for accessing services offered by one or more different MNOs 114 via communication through base stations 112-1 to 112-N. To be able to access services provided by the MNOs, one or more eSIMs can be provisioned to the eUICC 108 of the mobile wireless device 102. In some embodiments, access to information included in and/or associated with an eSIM of the one or more eSIMs (or information of a SIM on a physical UICC) can be required to gain access to services of an MNO, including cellular services or non-cellular services. In some embodiments, access to processing by the eUICC (or to the physical UICC) can be required to access services of the MNOs.

FIG. 2 illustrates a block diagram 200 of a more detailed view of exemplary components of the system 100 of FIG. 1. The one or more processors 104, in conjunction with the memory 106, can implement a main operating system (OS) 202 that is configured to execute applications 204 (e.g., native OS applications and user applications). The one or more processors 104 can include applications processing circuitry and, in some embodiments, wireless communications control circuitry. The applications processing circuitry can monitor application requirements and usage to determine recommendations about communication connection properties, such as bandwidth and/or latency, and provide information to the communications control circuitry to determine suitable wireless connections for use by particular applications. The communications control circuitry can process information from the applications processing circuitry as well as from additional circuitry, such as the baseband component 110, and other sensors (not shown) to determine states of components of the mobile wireless device 102, e.g., reduced power modes, as well as of the mobile wireless device 102 as a whole, e.g., mobility states. The communications control circuitry, in some embodiments, can also account for SIM/eSIM policies that influence whether an application or service of the mobile wireless device 102 can access particular RATs, such as access to 5G cellular connections. The communications control circuitry can provide control signals to the baseband component 110 to determine which RATs particular applications can access. The mobile wireless device 102 further includes an eUICC 108 that can be configured to implement an eUICC OS 206 to manage the hardware resources of the eUICC 108 (e.g., a processor and a memory embedded in the eUICC 108). The eUICC OS 206 can also be configured to manage eSIMs 208 that are stored by the eUICC 108, e.g., by enabling, disabling, modifying, updating, or otherwise performing management of the eSIMs 208 within the eUICC 108 and providing the baseband component 110 with access to the eSIMs 208 to provide access to wireless services for the mobile wireless device 102. The eUICC OS 206 can include an eSIM manager 210, which can perform management functions for various eSIMs 208. Each eSIM 208 can include a number of applets 212 that define the manner in which the eSIM 208 operates. For example, one or more of the applets 212, when implemented by the baseband component 110 and the eUICC 108, can be configured to enable the mobile wireless device 102 to communicate with an MNO 114 and provide useful features (e.g., phone calls and internet) to a user of the mobile wireless device 102.

A baseband component 110 of the mobile wireless device 102 can include a baseband OS 214 that is configured to manage hardware resources of the baseband component 110 (e.g., a processor, a memory, different radio components, etc.). The baseband component 110 can also be referred to as a wireless baseband component, a baseband wireless processor, a cellular baseband component, a cellular component, and the like. According to some embodiments, the baseband component 110 can implement a baseband manager 216 that is configured to interface with the eUICC 108 to establish a secure channel with a provisioning server 116 and obtain information (such as eSIM data) from the provisioning server 116 for purposes of managing eSIMs 208. The baseband manager 216 can be configured to implement services 218, which represent a collection of software modules that are instantiated by way of the various applets 212 of enabled eSIMs 208 that are included in the eUICC 108. For example, services 218 can be configured to manage different connections between the mobile wireless device 102 and MNOs 114 according to the different eSIMs 208 that are enabled within the eUICC 108. The baseband component 110 can serve as a primary interface to the eUICC 108 in some embodiments. In some embodiments, the eUICC 108 can be accessed via the baseband component 110 over the primary interface to manage eSIMs 208 (e.g., download, install, update, modify, enable, disable, etc.) and to interact with the eUICC 108, such as with the eUICC OS 206 and/or eSIM manager 210, to obtain, provide, and/or process information as required for access to services of an MNO 114. In some embodiments, the eUICC 108 can also be accessed via a separate interface by at least one of the one or more processors 104 to similarly manage eSIMs 208 and/or interact with the eUICC 108 for access to services of an MNO 114.

FIG. 3 illustrates a block diagram 300 of an exemplary SIM access architecture of a wireless device 102 that includes a baseband component 110. An application processor 104 (not shown) can include multiple software modules including a telephony module 310 that controls access to telephony functions for the wireless device 102, e.g., originating and terminating voice/video calls, establishing cellular wireless and non-cellular wireless data connections, sending and receiving short message service (SMS) and multimedia message service (MMS) messages, etc. The telephony module 310 can include a subscriber module 312 for managing information associated with one or more subscribers that subscribe to cellular and/or non-cellular wireless services. The telephony module 310 can also include a SIM/eSIM module 314 for managing and accessing SIM/eSIM information for the wireless device 102. The telephony module 310 interacts with the baseband component 110 via a primary telephony interface 324 to control access to cellular and/or non-cellular services. The baseband component 110 can include a SIM/eSIM control module 316 and a SIM/eSIM interface driver 318 for accessing SIM/eSIM information included in an eUICC 108 (and/or UICC, not shown) of the wireless device 102. The baseband component 110 can communicate with the eUICC 108 via a primary secure processing interface 320. When the baseband component 110 is fully powered, the telephony module 310 can communicate with the eUICC 108 via the baseband component 110 using the primary telephony interface 324, while the baseband component 110 further communicates with the eUICC 108 via the primary secure processing interface 320. When the baseband component 110 is in a reduced power state, in some circumstances, the telephony module 310 can communicate with the eUICC 108 through a secondary telephony interface 326 through a secondary wireless module 304 that uses a secondary secure processing interface 322 to communicate with the eUICC 108. In some embodiments, the secondary wireless module 304 can communicate via the secondary secure processing interface 322 with secondary wireless circuitry 308 that is connected to the eUICC 108. Representative communication via the secondary telephony interface 326 and the secondary secure processing interface 322 can include commands for obtaining profile (SIM/eSIM) information, managing (e.g., enabling, disabling, installing, modifying, updating, etc.) profiles, selecting profiles, selecting files of the eUICC 108, managing (reading, writing, etc.) files of the eUICC 108, and authentication commands. In some embodiments, the secondary wireless circuitry 308 and the eUICC 108 can be packaged together as a secure processing component 306. In some embodiments, the secure processing component 306 can further include an embedded secure element (eSE) 330 that provides additional secure processing functions, such as for secure financial or secure identification transactions. The telephony module 310 can also communicate with a Wi-Fi module 302 for initiating and/or managing non-cellular wireless connections over a Wi-Fi call messaging 328 interface. In some embodiments, such as for establishing and/or managing Wi-Fi services provided by an MNO 114, the telephony module 310 communicates with the eUICC 108 to obtain and/or provide information required for the Wi-Fi services. Representative information includes challenges and responses for an authentication procedure, such as an Extensible Authentication Protocol Authentication and Key Agreement (EAP-AKA) procedure. In some embodiments, the secondary wireless module 304 is a software module for controlling a separate wireless interface of the wireless device 102, such as a near-field communication (NFC) daemon software process. In some embodiments, the secondary wireless circuitry 308 is configured for providing an NFC interface. In some embodiments, the secondary secure processing interface 322 is a system power management interface (SPMI) that provides a high speed, low latency, bi-directional serial bus for real time interactions between the secondary wireless module 304 and the secondary wireless circuitry 308. In some embodiments, the secondary wireless module 304, the Wi-Fi module 302, and the telephony module 310, including the subscriber module 312 and SIM/eSIM module 314, are operational on a processor 104, such as an applications processor, of the wireless device 102. In some embodiments, the primary secure processing interface 320 between the baseband component 110 and the eUICC 108 (or the secure processing component 306 that includes the eUICC 108) is an International Standards Organization (ISO) 7816 interface. In some embodiments, the baseband component 110 is put into a reduced power state when possible to conserve limited batter power of the wireless device 102. In some embodiments, telephony functions of the telephony module 310 can boot up the baseband component 110 as required to gain access to and/or communicate with the eUICC 108. As described herein, in some embodiments, the processor 104 that includes the telephony module 310 can refrain from booting up the baseband component 110 and communicate with the eUICC 108 via the secondary secure processing interface 322 instead of via the primary secure processing interface 320 of the baseband component 110 to continue to save power. In some embodiments, certain operations may require access to the eUICC 108 via the baseband component 110 using the primary secure processing interface 320, while other operations may not require access to the eUICC 108 via the baseband component 110 using the primary secure processing interface 320 and can instead use the secondary secure processing interface 322 without booting up the baseband component 110 when in the reduced power state. In some embodiments, a wireless device 102 does not include a baseband component 110 but does include an eUICC 108 for access to services of an MNO 114 via non-cellular wireless access, such as through Wi-Fi circuitry. Access to the services of the MNO 114 can still require authentication or other information provided by the eUICC 108 and/or by eSIMs 208 included therein, and the wireless device 102 without the baseband component 110 can access the eUICC 108 via an available interface.

Figure 4A:
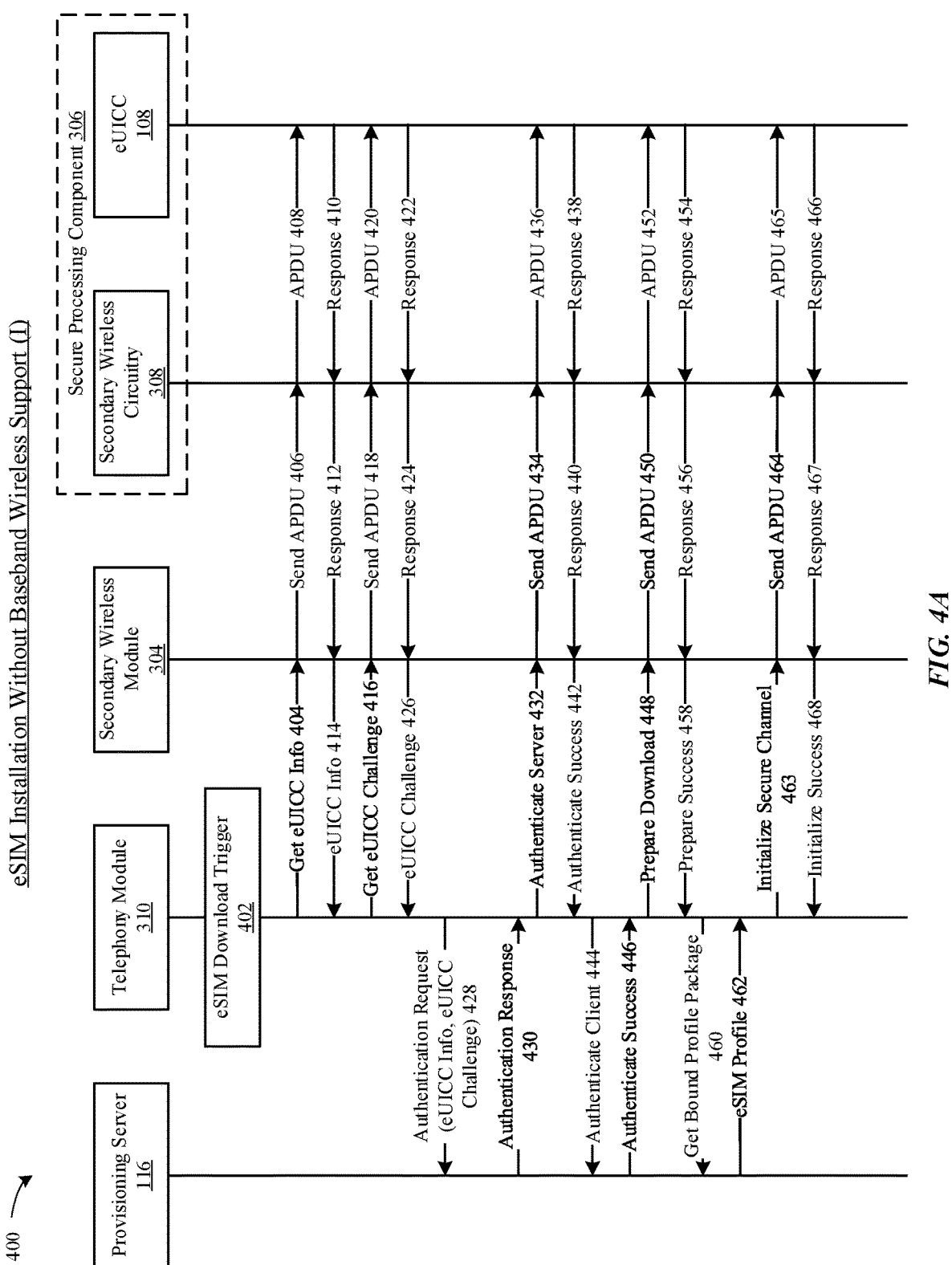

FIGS. 4A and 4B illustrate block diagrams 400, 470 of an exemplary set of actions to install an eSIM 208 to a secondary wireless device 102 without support from a baseband component 110. In some embodiments, the secondary wireless device 102 includes a baseband component 110 that is in reduced power state. In some embodiments, the secondary wireless device 102 does not include a baseband component 110. A telephony module 420 of the secondary wireless device 102 can receive a trigger 402 to download an eSIM 208 to the eUICC 108 of the secondary wireless device 102. Examples of triggers 402 can include an external server command, such as from an manufacturer-managed server, an MNO 114 web-sheet server, or resulting from a quick response (QR) code entry. The telephony module 310 can interact with the eUICC 108 to download the eSIM 208 by communicating through a secondary wireless module 304 that connects via a secondary secure processing interface 322 to secondary wireless circuitry 308 of a secure processing component 306 that includes the eUICC 108. At 404, the telephony module 310 sends a message to the secondary wireless module 304 to obtain information regarding the eUICC 108 of the wireless device 102. At 406, the secondary wireless module 304 transmits a command to the secondary wireless circuitry 308 to send an applicable application protocol data unit (APDU) command at 408 to the eUICC 108. At 410, the eUICC 108 provides a response to the secondary wireless circuitry 308, which forwards the response at 412 to the secondary wireless module 304. At 414, the secondary wireless module 304 provides the requested information from the eUICC 108 to the telephony module 310. Next, the telephony module initiates communication with the eUICC 108 to obtain and provide information required for authentication with a provisioning server 116 from which to download the eSIM 208. At 416, the telephony module 310 sends a message to the secondary wireless module 304 to obtain a challenge value from the eUICC 108 to use for authentication with the provisioning server 116. At 418, the secondary wireless module 304 transmits a command to the secondary wireless circuitry 308 to send an applicable APDU command at 420 to the eUICC 108. At 422, the eUICC 108 provides a response to the secondary wireless circuitry 308, which forwards the response at 424 to the secondary wireless module 304. At 426, the secondary wireless module 304 provides the challenge from the eUICC 108 to the telephony module 310. At 428, the telephony module sends an authentication request message to the provisioning server 116, where the authentication request message includes information about the eUICC and the challenge from the eUICC 108. At 430, the telephony module receives an authentication response message from the provisioning server. At 432, the telephony module 310 sends a message to the secondary wireless module 304 to authenticate the provisioning server 116. At 434, the secondary wireless module 304 transmits a command to the secondary wireless circuitry 308 to send an applicable APDU command at 436 to the eUICC 108. At 438, the eUICC 108 provides a response to the secondary wireless circuitry 308, which forwards the response at 440 to the secondary wireless module 304. At 442, the secondary wireless module 304 provides an authentication response to the telephony module 310 from the eUICC 108 (in this case a successful authentication response from the eUICC 108). At 444, the telephony module 310 sends a message to the provisioning server 116, the message including information for authenticating the (client) secondary wireless device 102. At 446, the telephony module 310 receives from the provisioning server 116 a successful authentication response. At 448, the telephony module 310 sends a message to the secondary wireless module 304 to prepare the eUICC 108 for downloading the eSIM 208 from the provisioning server 116. At 450, the secondary wireless module 304 transmits a command to the secondary wireless circuitry 308 to send an applicable APDU command at 452 to the eUICC 108. At 454, the eUICC 108 provides a response to the secondary wireless circuitry 308, which forwards the response at 456 to the secondary wireless module 304. At 458, the secondary wireless module 304 indicates to the telephony module 310 successful preparation by the eUICC 108 for downloading the eSIM 208. At 460, the telephony module 310 sends a message to the provisioning server 116 to obtain a bound profile package (BPP) that includes the eSIM 208. At 462, the provisioning server 116 provides the eSIM 208 profile in the BPP to the telephony module 310. At 463, the telephony module sends a message to the secondary wireless module 304 to initialize a secure channel with the eUICC 108. At 464, the secondary wireless module 304 transmits a command to the secondary wireless circuitry 308 to send an applicable APDU command at 465 to the eUICC 108. At 466, the eUICC 108 provides a response to the secondary wireless circuitry 308, which forwards the response at 467 to the secondary wireless module 304. At 468, the secondary wireless module 304 indicates to the telephony module 310 successful establishment of the secure channel with the eUICC 108. At 471, the telephony module 310 sends a message to configure a service delivery platform (SDP) for downloading the eSIM 208 to the eUICC 108. At 472, the secondary wireless module 304 transmits a command to the secondary wireless circuitry 308 to send an applicable APDU command at 473 to the eUICC 108. At 474, the eUICC 108 provides a response to the secondary wireless circuitry 308, which forwards the response at 475 to the secondary wireless module 304. At 476, the secondary wireless module 304 indicates to the telephony module 310 successful configuration of the SDP. At 477, the telephony module 310 sends one or more commands to the secondary wireless module 304 to store metadata obtained from the BPP to the eUICC 108. At 478, the secondary wireless module 304 transmits a command to the secondary wireless circuitry 308 to send an applicable APDU command at 479 to the eUICC 108. At 480, the eUICC 108 provides a response to the secondary wireless circuitry 308, which forwards the response at 481 to the secondary wireless module 304. At 482, the secondary wireless module 304 indicates to the telephony module 310 successful storage of the metadata of the BPP by the eUICC 108. At 483, the telephony module 310 sends a command to the secondary wireless module 304 to load profile elements of the eSIM 208 to the eUICC 108. At 484, the secondary wireless module 304 transmits a command to the secondary wireless circuitry 308 to send an applicable APDU command at 485 to the eUICC 108. At 486, the eUICC 108 provides a response to the secondary wireless circuitry 308, which forwards the response at 487 to the secondary wireless module 304. At 488, the secondary wireless module 304 indicates to the telephony module 310 successful loading of the eSIM 208 on the eUICC 108. At 489, the telephony module 310 sends a message to the provisioning server 116 indicating the successful result of loading the eSIM 208 profile on the eUICC 108, and the provisioning server 116 replies with an OK response message at 490. At 491, the telephony module 310 sends a message to the secondary wireless module 304 to enable the eSIM 208 profile loaded to the eUICC 108. At 492, the secondary wireless module 304 transmits a command to the secondary wireless circuitry 308 to send an applicable APDU command at 493 to the eUICC 108. At 494, the eUICC 108 provides a response to the secondary wireless circuitry 308, which forwards the response at 495 to the secondary wireless module 304. At 496, the secondary wireless module 304 provides to the telephony module 310 a message indicating successful enabling of the eSIM 208 on the eUICC 108 of the secondary wireless device 102. Notably, in the provisioning process illustrated in FIGS. 4A and 4B, the secondary wireless device 102 does not interact with or require use of a baseband component 110 to load the eSIM 208 to the eUICC 108. As such, a secondary wireless device 102 that does not include a baseband component 110 can load an eSIM 208 to an eUICC 108 included therein.

Figure 5:
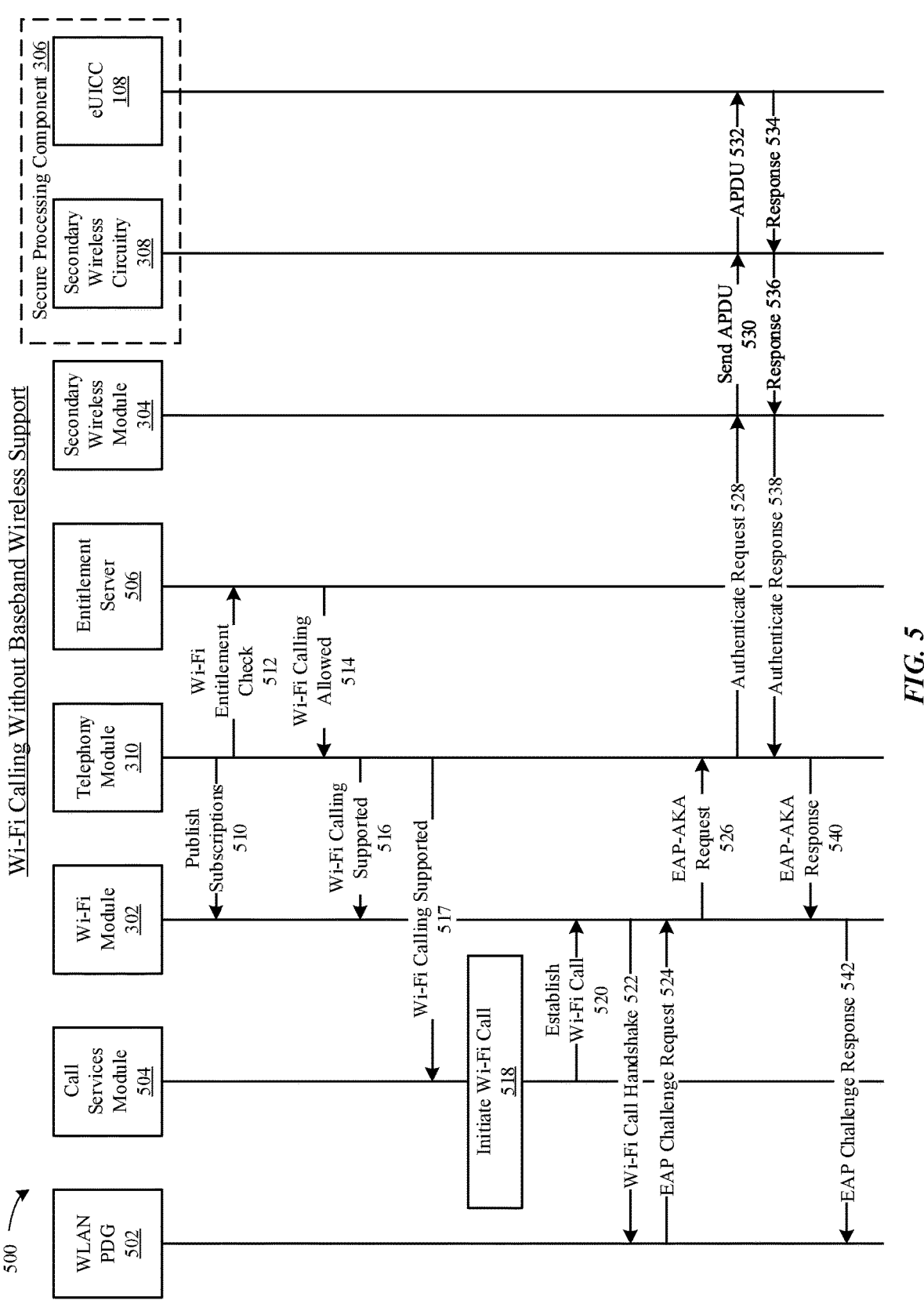
FIG. 5 illustrates a block diagram of an exemplary set of actions to establish a Wi-Fi call by a wireless device without support from a baseband component, according to some embodiments.

FIG. 5 illustrates a block diagram 500 of an exemplary set of actions to establish a non-cellular wireless connection, e.g., a Wi-Fi call, by a wireless device 102 without support from a baseband component 110. In some embodiments, the wireless device 102 includes a baseband component 110 and performs the actions while the baseband component 110 is in a reduced power state. In some embodiments, the wireless device 102 does not include a baseband component 110. At 510, the wireless device 102 sends a message to the Wi-Fi module publishing subscriptions available to the wireless device 102, e.g., indicating one or more services to which a user of the wireless device 102 subscribes. At 512, the telephony module 310 sends a message to an entitlement server 506 to check whether the wireless device 102 is allowed to establish Wi-Fi calls. At 514, the entitlement server 506 responds to the query from the telephony module 310 with a message indicating that Wi-Fi calling is allowed for the wireless device 102. At 516, the telephony module 310 sends a message to the Wi-Fi module 302 indicating that Wi-Fi calling is supported. At 517, the telephony module 310 sends a message to a call services module 504 of the wireless device 102 indicating that Wi-Fi calling is supported. At 518, the call services module 504 initiates a Wi-Fi call. At 520, the call services module 504 sends a message to the Wi-Fi module 302 to establish a Wi-Fi call. At 522, the Wi-Fi module sends a message to a wireless local area network (WLAN) packet data gateway (PDG) 502 of an MNO 114 to which the wireless device 102 subscribes to a Wi-Fi calling service, the message performing a handshake for the Wi-Fi call with the WLAN PDG 502 of the MNO 114. At 524, the WLAN PDG 502 sends a message to the Wi-Fi module 302 requesting a challenge response from the wireless device 102 to use to authenticate the wireless device 102, e.g., for an EAP-AKA procedure between the WLAN PDG 502 and the eUICC 108 of the wireless device 102. At 526, the Wi-Fi module 302 sends an EAP-AKA request to the telephony module 310 to forward to the eUICC 108 for authentication. At 528, the telephony module 310 sends an authenticate request message to the secondary wireless module 304, which sends a command, at 530, to the secondary wireless circuitry 308 to transmit an applicable APDU command at 532 to the eUICC 108. At 534, the eUICC 108 provides a response to the secondary wireless circuitry 308, which forward the response at 536 to the secondary wireless module 304. At 538, the secondary wireless module 304 provides an authenticate response message to the telephony module 310, which sends an EAP-AKA response at 540 to the Wi-Fi module in response to the EAP-AKA request previously received at 526. The Wi-Fi module 302 replies to the EAP challenge request message received at 524 with an EAP challenge response at 542 to authenticate with the WLAN PDG 502 for the requested Wi-Fi call. Access to the eUICC 108 to obtain the appropriate challenge response in order to establish the Wi-Fi call can be accomplished by the wireless device 102 without access to support of a baseband component 110 (which can be optionally included in the wireless device 102). In some embodiments, the eUICC 108 includes one or more eSIMs 208 that include credentials to allow for Wi-Fi calling (and/or other services of an MNO 114) without requiring use of a baseband component 110 of the wireless device 102.

Figure 6A:
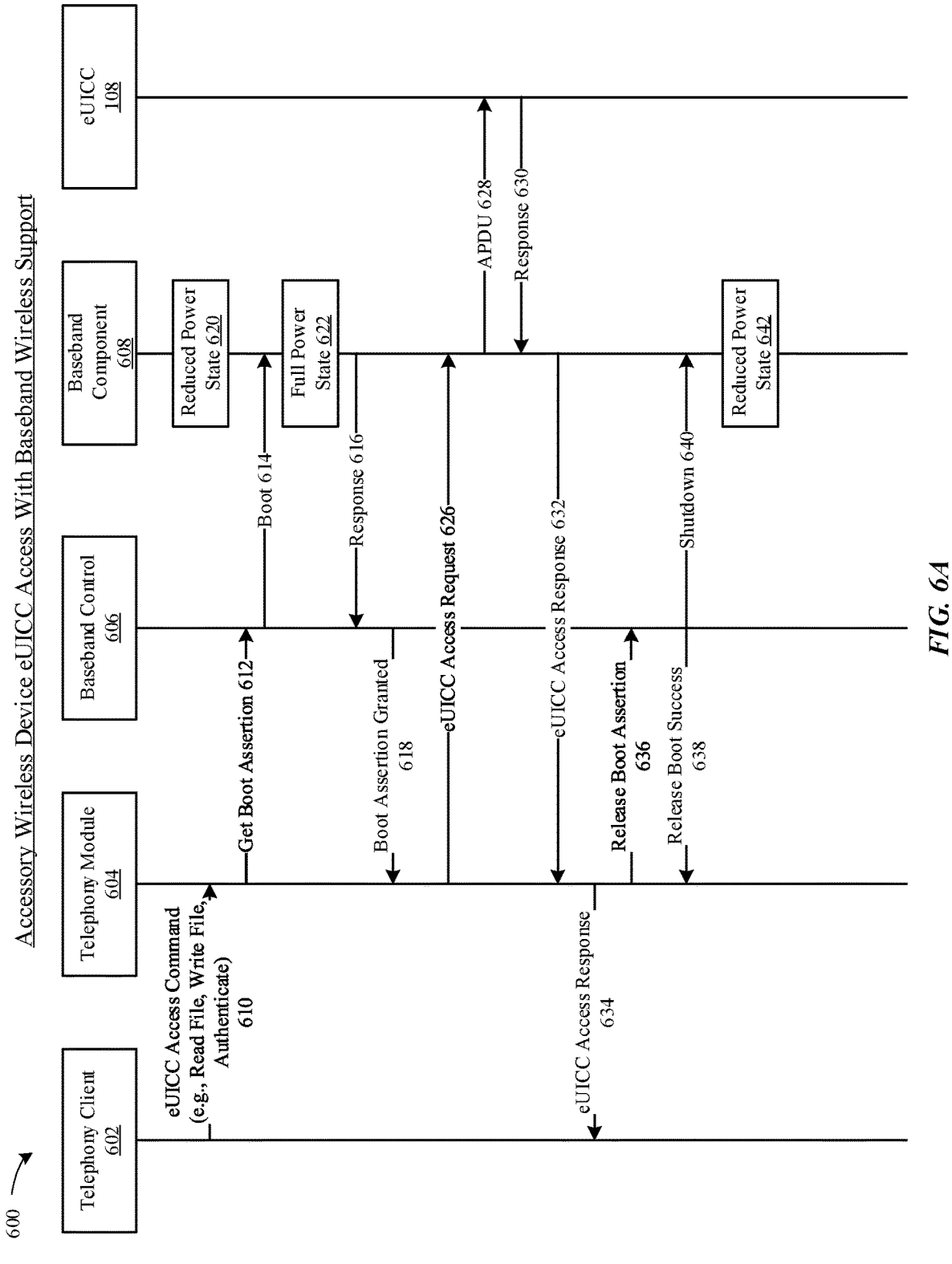
FIG. 6A illustrates a block diagram of an exemplary set of actions to access an eUICC of an accessory wireless device with support from a baseband component, according to some embodiments.

FIG. 6A illustrates a block diagram 600 of an exemplary set of actions to access an eUICC 108 of an accessory wireless device 102 with support from a baseband component 110. At 610, a telephony client 602 application process of the accessory wireless device 102 sends to a telephony module 604 a command to access the eUICC 108, e.g., to read a file, to write a file, to authenticate a service, to provision an eSIM 208, to manage an eSIM 208, etc. At 612, the telephony module 604 sends a command to a baseband control 606 application process, the command asserting a boot process for a baseband component 608, which can be in a reduced power state, as indicated at 620. The baseband control 606 application process, at 614, can send a boot command to the baseband component 608, which can boot from the reduced power state at 620 to a full power state at 622. The baseband component 608, at 616, can provide a response to the boot command to the baseband control 606 application process. The baseband control 606 application process can respond subsequently to the telephony module 604, at 618, with an indication that the boot assertion has been granted, indicating that the baseband component 608 is in a full power state 622. At 626, the telephony module 604 can send a request to the baseband component 608 to access the eUICC 108, the request corresponding to the command received previously from the telephony client 602 application process, and the baseband component 608, at 628, sends an applicable APDU command to the eUICC 108, which provides a response at 620. The baseband component 608 replies to the telephony module, at 632, with a response to the eUICC access request, and the telephony module, at 634, forwards the response to the telephony client 602 application process. At 636, the telephony module 604 application process sends a message to the baseband control 606 to release the boot assertion of the baseband component 608, and the baseband control 606, at 640, sends a message to the baseband component 608 to shut down and return to the reduced power state at 642. The baseband control 606 also provides an indication back to the telephony module 604, at 638, that release of the boot assertion has successfully occurred. The set of actions illustrated show that a single access request for the eUICC 108 can require booting up a baseband component 608 when there is no other interface for communicating with the eUICC 108 except via the baseband component 608. This can consume limited battery power of the accessory wireless device 102. In some embodiments, the baseband component 608 corresponds to the baseband component 110 of FIGS. 1, 2, and 3.

Figure 6B:
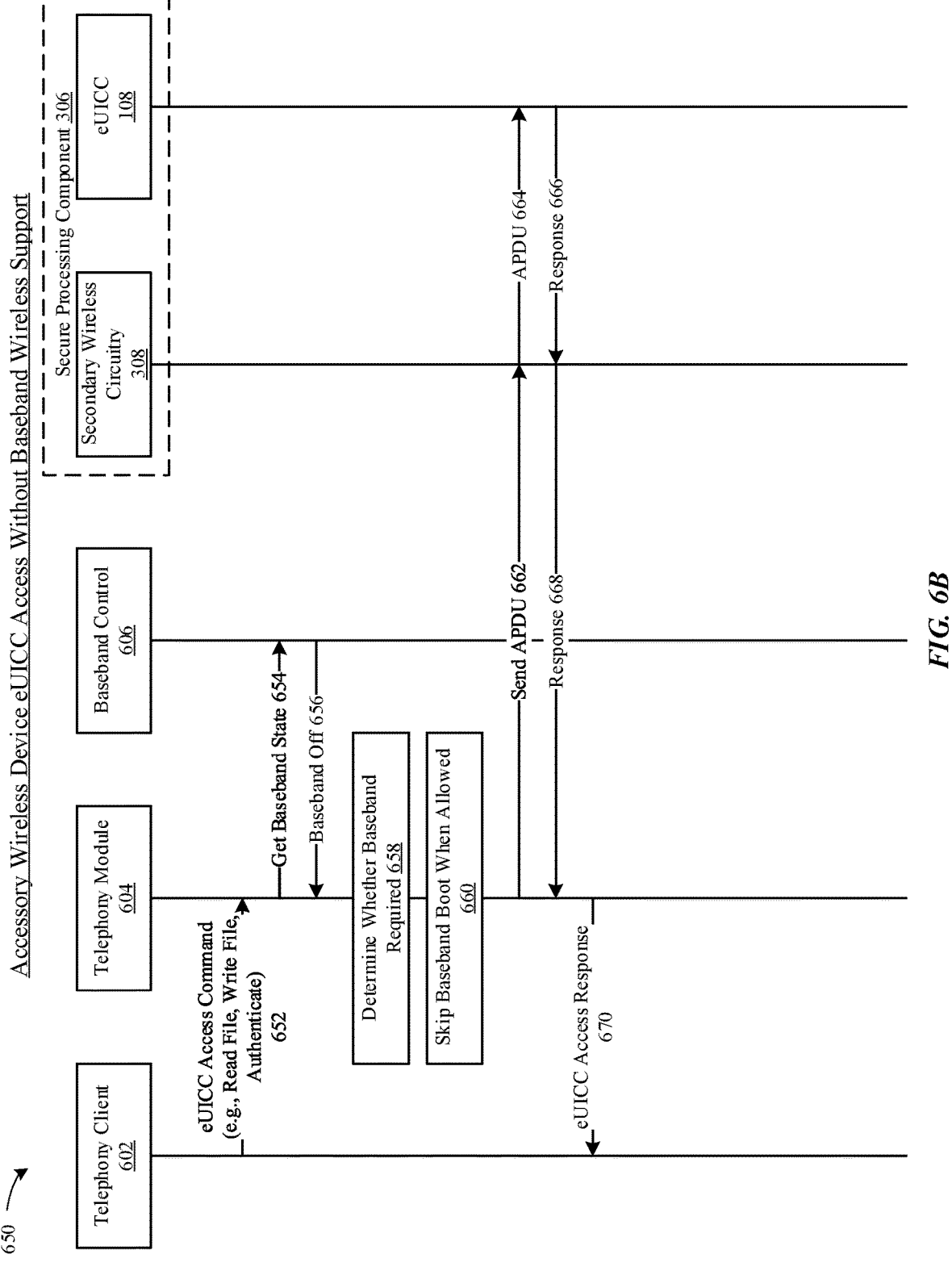
FIG. 6B illustrates a block diagram of an exemplary set of actions to access an eUICC of an accessory wireless device without support from a baseband component, according to some embodiments.

FIG. 6B illustrates a block diagram 650 an exemplary set of actions to access an eUICC 108 of an accessory wireless device 102 without support from a baseband component 110 (which can be present but remain in a reduced power state). At 652, a telephony client 602 application process of the accessory wireless device 102 sends to a telephony module 604 a command to access the eUICC 108, e.g., to read a file, to write a file, to authenticate for a service, to provisioning an eSIM 208, to manage an eSIM 208, etc. At 654, the telephony module 604 sends a message to the baseband control 606 requesting a state of the baseband component 110. At 656, the baseband control 606 responds to the telephony module 604 with a message indicating that the baseband component 110 is in a reduced power (or off) state. At 658, the telephony module 604 determines whether the command received at 652 from the telephony client 602 requires access to the eUICC 108 via the baseband component 110. At 660, the telephony module 604 forgoes booting up the baseband component 110 when allowed based at least in part on the determination made at 658. Certain requests for access to the eUICC 108 can require use of the baseband component 110 while other requests may not require access through the baseband component 110. Exemplary requests to access the eUICC 108 that may not require use of the baseband component 110 can include authentication for a Wi-Fi connection (e.g., voice over Wi-Fi calling), reading from a file on the eUICC 108, writing to a file on the eUICC 108, installing an eSIM 208, management of a user file on the eUICC 108, e.g., a user phonebook. management of one or more eSIMs 208 on the eUICC 108. Exemplary requests to access the eUICC 108 that may require use of the baseband component 110 can include an Internet Multimedia System (IMS) operation, such as those that require extensive IMS SIM (ISIM) application context information, and security sensitive operations, such as a cellular service personal identification number (PIN) validation. At 662, the telephony module 604 sends a message to secondary wireless circuitry 308 of the accessory wireless device 102 to send an APDU command to the eUICC 108. At 664, the secondary wireless circuitry 308 sends an applicable APDU command to the eUICC 108 and receives, at 666, a response from the eUICC 108. The secondary wireless circuitry 308, at 668, forwards the response from the eUICC 108 to the telephony module 604 for processing. At 670, the telephony module 604 provides a response to eUICC access request to the telephony client 602. The actions shown indicate that when allowed, the eUICC 108 can be accessed via a communication path that does not require a baseband component 110 to be in a full power state. In some embodiment, the telephony client 602, telephony module 604, and baseband control 606 are resident on a processor 104 of the accessory wireless device 102, such as on an application processor, and the processor 104 has access to the eUICC 108 via two different mechanisms, one through an interface via a baseband component 110 that communicates directly with the eUICC 108, and a second through a separate interface via secondary wireless circuitry 308 that communicates directly with the eUICC 108.

FIG. 7 illustrates a flowchart 700 of an exemplary set of actions to access an eUICC 108 of an accessory wireless device 102 with optional support from a baseband component 110. The accessory wireless device 102 can determine whether to boot the baseband component 110 from a reduced power state based on one or more criteria. When a request for access to an eUICC 108 does not require access via the baseband component 110, the accessory wireless device 102 can attempt to access the eUICC 108 via an alternative interface without booting the baseband component 110. When access via the alternative interface is not successful, the baseband component 110 can be booted, in some cases, to re-attempt accessing the eUICC 108. When a request for access to the eUICC 108 requires access via the baseband component 110, the accessory wireless device 102 can boot the baseband component 110 conditionally based on whether a battery level of the accessory wireless device 102 satisfies a battery threshold level. In some scenarios, the accessory wireless device 102 is paired with a primary (or companion) wireless device 102 and boots the baseband component only under certain conditions when not within proximity of the primary wireless device 102. In some embodiments, the accessory wireless device 102 boots the baseband component 110 to a full power state (if required) to establish a Wi-Fi call when allowed and when the primary wireless device 102 is not within proximity of the accessory wireless device to be used for the Wi-Fi call. In some embodiments, when access to the eUICC 108 via an alternative interface (leaving the baseband component 110 in a reduced power state) does not succeed, the processor 104 can evaluate whether to re-attempt access to the eUICC 108 with the baseband component 110 booted to a full power state. In some cases, the processor 104 determines whether to re-attempt access using the baseband component 110 based at least in part on a returned error status code. Example error status codes can include a driver failure indication for the alternative interface or a technical error associated with the eUICC, such as an eUICC operating system (OS) technical error.

At 702, a processor 104 of the accessory wireless device 102 receives a request from a telephony client 602. At 704, the processor 104 of the accessory wireless device 102 determines whether a baseband component 110 is in full power state (booted up and not in a reduced power state). When the baseband component 110 is in the full power state, the processor 104, at 716, forwards the request from the telephony client 602 to the baseband component 110 for processing and/or sending to the eUICC 108. Subsequently, at 718, the processor 104 receives a response from the baseband component 110 and forwards the response, at 718, to the telephony client 602. When the baseband component 110 is in a reduced power state (as determined at 704), the processor 104 determines whether the accessory device 102 is within proximity of an associated (e.g., previously paired) primary wireless device 102. When the accessory wireless device 102 is within proximity of the primary wireless device 102, the processor 104 classifies the request from the telephony client 602 to determine whether access to the eUICC 108 requires use of the baseband component 110, which is in the reduced power state, or can bypass the baseband component 110. Example requests that can require use of the baseband component 110 can include IMS related operations and security sensitive PIN validation processes. Example requests that may not require use of the baseband component 110 can include authentication for a Wi-Fi connection, eUICC or eSIM file access (such as reading from and/or writing to a file), eSIM management (installing, updating, modifying, enabling, disabling, etc.), and user file management (e.g., synchronization of a user phonebook maintained at least in part on the eUICC 108 of the accessory wireless device 102). When access via the baseband component 110 is required by the request based on the classification performed at 708, the accessory wireless device 102 can determine, at 724, whether a battery level of the accessory wireless device 102 satisfies a battery threshold. When the battery threshold is satisfied, the processor 104 can send a message to cause the baseband component to be booted from the reduced power state to a full power state at 714. Once booted up to a full power state, the baseband component 110 can forward the request to the eUICC 108 and at 710 provide to the processor 104 a response obtained from the eUICC 108. The processor 104 can then provide a response, at 718, to the telephony client 602. When the battery level of the accessory wireless device 102 does not satisfy the battery threshold at 724 or when the baseband component 110 is not required for access to the eUICC 108 for the specific request from the telephony client 602 (as determined at 710), the processor 104 can forward the request to a secondary wireless module at 722 to communicate with the eUICC 108 without booting up the baseband component 110 from the reduced power state. At 720, the processor 104 can evaluate whether a response has been successfully returned from the eUICC 108 via the secondary wireless module. When a response has been obtained successfully from the eUICC 108, the processor 104 can forward the response to the telephony client 602. When a response has not been obtained successfully from the eUICC 108, the processor 104 can boot the baseband component 110 at 714 to re-attempt to obtain a response from the eUICC 108 via an interface of the baseband component 110 (rather than via an interface using the secondary wireless module that failed to provide a successful result). When the accessory wireless device 102 is not within proximity to the primary wireless device 102, the accessory wireless device 102 can determine, at 712, whether Wi-Fi calling is allowed for the accessory wireless device 102, such as based on properties of a wireless service subscription. This check, performed at 712, can be useful when the request from the telephony client 602 is to establish a Wi-Fi call. When Wi-Fi calling is allowed for the accessory wireless device 102 and the primary wireless device 102 is not within proximity of the accessory wireless device 102, the processor 104 can boot the baseband component 110, at 714, from a reduced powered state to a full power state so that the baseband component 110 can forward the request from the telephony client 602 to the eUICC 108 at 716. The processor 104 can receive from the baseband component 110, at 718, a response to the request from the eUICC 108 to return to the telephony client 602.

Figure 8:
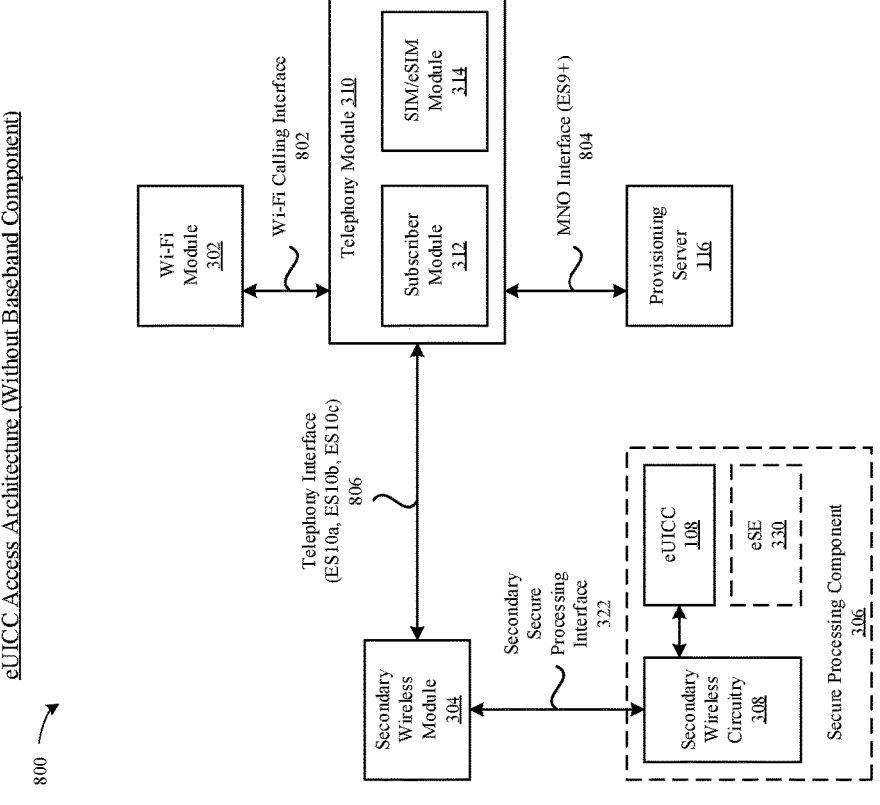
FIG. 8 illustrates a block diagram of an exemplary eUICC access architecture without a baseband component, according to some embodiments.

FIG. 8 illustrates a block diagram 800 of an exemplary eUICC 108 access architecture for a wireless device 102 that does not include a baseband component 110. An application processor 104 (not shown) can include multiple software modules including a telephony module 310 that controls access to telephony functions for the wireless device 102, e.g., originating and terminating voice/video calls, establishing cellular and non-cellular data connections, sending and receiving short message service (SMS) and multimedia message service (MMS) messages, etc. The telephony module 310 can include a subscriber module 312 for managing information associated with one or more subscribers that subscribe to cellular and/or non-cellular wireless services. The telephony module 310 can also include a SIM/eSIM module 314 for managing and accessing SIM/eSIM information for the wireless device 102. The telephony module 310 can communicate with the eUICC 108 through a telephony interface 806 through a secondary wireless module 304 that uses a secondary secure processing interface 322 to communicate with the eUICC 108. In some embodiments, the secondary wireless module 304 can communicate via the secondary secure processing interface 322 with secondary wireless circuitry 308 that is connected to the eUICC 108. Representative communication via the telephony interface 806 and the secondary secure processing interface 322 can include commands for obtaining profile (SIM/eSIM) information, managing (e.g., enabling, disabling, installing, modifying, updating, etc.) profiles, selecting profiles, selecting files of the eUICC 108, managing (reading, writing, etc.) files of the eUICC 108, and authentication commands. In some embodiments, the secondary wireless circuitry 308 and the eUICC 108 can be packaged together as a secure processing component 306. In some embodiments, the secure processing component 306 can further include an embedded secure element (eSE) 330 that provides additional secure processing functions, such as for secure financial or secure identification transactions. The telephony module 310 can also communicate with a Wi-Fi module 302 for initiating and/or managing non-cellular wireless connections over a Wi-Fi call messaging interface 802. In some embodiments, such as when establishing and/or managing Wi-Fi services provided by an MNO 114, the telephony module 310 communicates with the eUICC 108 to obtain and/or provide information required for the Wi-Fi services. Representative information includes challenges and responses for an authentication procedure, such as an Extensible Authentication Protocol Authentication and Key Agreement (EAP-AKA) procedure. In some embodiments, the secondary wireless module 304 is a software module for controlling a separate wireless interface of the wireless device 102, such as a near-field communication (NFC) daemon software process. In some embodiments, the secondary wireless circuitry 308 is configured for providing an NFC interface. In some embodiments, the secondary secure processing interface 322 is a system power management interface (SPMI) that provides a high speed, low latency, bi-directional serial bus for real time interactions between the secondary wireless module 304 and the secondary wireless circuitry 308. In some embodiments, the secondary wireless module 304, the Wi-Fi module 302, and the telephony module 310, including the subscriber module 312 and SIM/eSIM module 314 are operational on a processor 104, such as an applications processor, of the wireless device 102.

Exemplary uses for the architecture illustrated in FIG. 8 can include i) a non-cellular wireless device without a baseband component 110 that can include an eUICC 108 with one or more eSIMs 208 for access to services of an MNO 114, ii) installation of an eSIM 208 from a provisioning server 116 to the eUICC 108, such as using a SGP.22 protocol, iii) selection of an eSIM 208 on an eUICC 108 based on an ES10 interface protocol, iv) selection of an eSIM 208 based on a European Technical Standards Institute (ETSI) or 3GPP protocol, v) Wi-Fi calling without support of a baseband component 110 using with a telephony client communicating with the eUICC 108 for authentication as required via an interface other than one normally provided by a baseband component 110 to communicate with the eUICC 108.

FIG. 9A illustrates a flowchart 900 of an exemplary method performed by a processor 104 of a wireless device 102 to access an eUICC 108 of the wireless device 102. At 902, the processor external to the eUICC 108 receives a request that requires access to the eUICC 108. At 904, the processor 104 forwards the request to a baseband component 110 to communicate with the eUICC 108 via a first interface when the baseband component 110 of the wireless device 102 is not in a reduced power state. At 906, when the baseband component 110 is in a reduced power state and the request requires access via the baseband component 110, the processor 104: i) boots the baseband component 110 to a normal (full) power state, and ii) forwards the request to the baseband component 110 to communicate with the eUICC 108 via the first interface. At 908, when the baseband component 110 is in the reduced power state and the request does not require access via the baseband component 110, the processor 104 sends the request to the eUICC 108 via a second interface without booting the baseband component 110 to the normal (full) power state. At 910, the processor 104 processes a result obtain from the eUICC 108 in response to the request.

In some embodiments, the method further includes the processor 104 of the wireless device 102 external to the eUICC 108 performing the following actions when the request is sent via the second interface and the result obtained from the eUICC 108 indicates a failure: i) booting the baseband component 110 to the normal (full) power state, ii) forwarding the request to the baseband component 110 to communicate with the eUICC 108 via the first interface, and iii) processing a second result obtained from the eUICC 108 in response to the request. In some embodiments, the request requires access via the baseband component 110 for an IMS operation. In some embodiments, the request requires access via the baseband component 110 to perform a security-sensitive personal identification number (PIN) validation. In some embodiments, the request does not require access via the baseband component 110 to authenticate a Wi-Fi call. In some embodiments, the request does not require access via the baseband component 110 to install, update, or modify an eSIM 208 on the eUICC 108 of the wireless device 102. In some embodiments, the request does not require access via the baseband component 110 to read or write an electronic file (EF) on the eUICC 108 of the wireless device 102.

FIG. 9B illustrates a flowchart 950 of another exemplary method performed by a processor 104 of a wireless device 102 to access an eUICC 108 of the wireless device 102. At 952, the processor external to the eUICC 108 receives a request that requires access to the eUICC 108, where the eUICC 108 is accessible through a baseband component 110 via a first interface or via a second interface that is not associated with the baseband component 110. At 954, when the request does not require access via the baseband component 110, the processor 104 sends the request to the eUICC 108 via the second interface without booting the baseband component 110 to a normal (full) power state. At 956, the processor 104 processes a result obtain from the eUICC 108 in response to the request.

In some embodiments, at 958, the processor 104 forwards the request to the baseband component 110 to communicate with the eUICC 108 via the first interface when the baseband component 110 of the wireless device 102 is in the normal (full) power state. In some embodiments, at 960, when the baseband component 110 is in a reduced power state and the request requires access via the baseband component 110, the processor 104: i) boots the baseband component 110 to the normal (full) power state, and ii) forwards the request to the baseband component 110 to communicate with the eUICC 108 via the first interface.

In some embodiments, the method further includes the processor 104 of the wireless device 102 external to the eUICC 108 performing the following actions when the request is sent via the second interface and the result obtained from the eUICC 108 indicates a failure: i) booting the baseband component 110 to the normal (full) power state, ii) forwarding the request to the baseband component 110 to communicate with the eUICC 108 via the first interface, and iii) processing a second result obtained from the eUICC 108 in response to the request. In some embodiments, the request requires access via the baseband component 110 for an IMS operation. In some embodiments, the request requires access via the baseband component 110 to perform a security-sensitive personal identification number (PIN) validation. In some embodiments, the request does not require access via the baseband component 110 to authenticate a Wi-Fi call. In some embodiments, the request does not require access via the baseband component 110 to install, update, or modify an eSIM 208 on the eUICC 108 of the wireless device 102. In some embodiments, the request does not require access via the baseband component 110 to read or write an electronic file (EF) on the eUICC 108 of the wireless device 102.

FIG. 10A illustrates a flowchart 1000 of an exemplary method performed by a processor 104 of a secondary wireless device 102 to access an eUICC 108 of the secondary wireless device 102, where the secondary wireless device 102 has been previously paired with a primary wireless device 102. The secondary wireless device 102 may also be referred to as an accessory wireless device 102. The primary wireless device 102 may also be referred to as a companion wireless device 102. At 1002, the processor receives a request that requires access to the eUICC 108 of the secondary wireless device 102. At 1004, when a baseband component 110 of the secondary wireless device 102 is not in a reduced power state, the processor forwards the request to a baseband component 110 of the secondary wireless device 102 to communicate with the eUICC 108 via a first interface. At 1006, when i) the baseband component 110 is in the reduced power state, ii) the secondary wireless device 102 is not within proximity of the primary wireless device 102, and iii) Wi-Fi calling is not allowed or a Wi-Fi connection is not available, the processor 104: a) boots the baseband component 110 to a normal (full) power state, and b) forwards the request to the baseband component 110 to communicate with the eUICC 108 via the first interface. At 1008, when i) the secondary wireless device is within proximity of the primary wireless device, and ii) the request does not require access via the baseband component 110, the processor 104 sends the request to the eUICC 108 via a second interface without booting the baseband component 110 to the normal (full) power state. At 1010, the processor 104 of the secondary wireless device 102 processes a result obtained from the eUICC 108 in response to the request.

In some embodiments, the method further includes the processor 104 of the secondary wireless device 102 external to the eUICC 108 performing the following actions when the request is sent via the second interface and the result obtained from the eUICC 108 in response to the request indicates a failure: i) booting the baseband component 110 to the normal (full) power state, ii) forwarding the request to the baseband component 110 to communicate with the eUICC 108 via the first interface, and iii) processing a second result obtained from the eUICC 108 in response to the request. In some embodiments, the failure includes an error associated with the second interface. In some embodiments, the request includes an indication to establish a voice connection between the secondary wireless device 102 and another wireless device 102. In some embodiments, the voice connection includes a voice over Wi-Fi (VoWi-Fi) call. In some embodiments, the voice connection includes an IMS voice call, and the request requires access to the eUICC 108 via the baseband component 110. In some embodiments, the processor 104 of the secondary wireless device 102 external to the eUICC 108 determines whether the request requires access to the eUICC 108 via the baseband component 110 when the secondary wireless device 102 is within proximity to the primary wireless device 102. In some embodiments, the processor 104 external to the eUICC 108 of the secondary wireless device 102 determines that the request requires access to the eUICC 108 via the baseband component 110 when i) the secondary wireless device 102 is not within proximity to the primary wireless device 102, and ii) Wi-Fi calling is not allowed for the secondary wireless device 102, or Wi-Fi connectivity is not available to the secondary wireless device 102. In some embodiments, the request requires access to the eUICC 108 to establish an IMS connection. In some embodiments, the request does not require access to the eUICC 108 to establish a voice over Wi-Fi (VoWi-Fi) call when Wi-Fi calling is allowed and Wi-Fi connectivity is available to the secondary wireless device 102.

FIG. 10B illustrates a flowchart 1050 of another exemplary method performed by a processor 104 of a secondary wireless device 102 to access an eUICC 108 of the secondary wireless device 102, where the secondary wireless device 102 has been previously paired with a primary wireless device 102. At 1052, the processor receives a request that requires access to the eUICC 108 of the secondary wireless device 102, where the eUICC 108 is accessible through a baseband component 110 via a first interface or via a second interface that is not associated with the baseband component 110. At 1054, when i) the secondary wireless device is within proximity of the primary wireless device, and ii) the request does not require access via the baseband component 110, the processor 104 sends the request to the eUICC 108 via the second interface without booting the baseband component 110 to a normal (full) power state. At 1056, the processor 104 of the secondary wireless device 102 processes a result obtained from the eUICC 108 in response to the request.

In some embodiments, at 1058, when the baseband component 110 of the secondary wireless device 102 is in the normal (full) power state, the processor forwards the request to the baseband component 110 of the secondary wireless device 102 to communicate with the eUICC 108 via the first interface. At 1060, when i) the baseband component 110 is in a reduced power state, ii) the secondary wireless device 102 is not within proximity of the primary wireless device 102, and iii) Wi-Fi calling is not allowed or a Wi-Fi connection is not available, the processor 104: a) boots the baseband component 110 to the normal (full) power state, and b) forwards the request to the baseband component 110 to communicate with the eUICC 108 via the first interface.

In some embodiments, the method further includes the processor 104 of the secondary wireless device 102 external to the eUICC 108 performing the following actions when the request is sent via the second interface and the result obtained from the eUICC 108 in response to the request indicates a failure: i) booting the baseband component 110 to the normal (full) power state, ii) forwarding the request to the baseband component 110 to communicate with the eUICC 108 via the first interface, and iii) processing a second result obtained from the eUICC 108 in response to the request. In some embodiments, the failure includes an error associated with the second interface. In some embodiments, the request includes an indication to establish a voice connection between the secondary wireless device 102 and another wireless device 102. In some embodiments, the voice connection includes a voice over Wi-Fi (VoWi-Fi) call. In some embodiments, the voice connection includes an IMS voice call, and the request requires access to the eUICC 108 via the baseband component 110. In some embodiments, the processor 104 of the secondary wireless device 102 external to the eUICC 108 determines whether the request requires access to the eUICC 108 via the baseband component 110 when the secondary wireless device 102 is within proximity to the primary wireless device 102. In some embodiments, the processor 104 external to the eUICC 108 of the secondary wireless device 102 determines that the request requires access to the eUICC 108 via the baseband component 110 when i) the secondary wireless device 102 is not within proximity to the primary wireless device 102, and ii) Wi-Fi calling is not allowed for the secondary wireless device 102, or Wi-Fi connectivity is not available to the secondary wireless device 102. In some embodiments, the request requires access to the eUICC 108 to establish an IMS connection. In some embodiments, the request does not require access to the eUICC 108 to establish a voice over Wi-Fi (VoWi-Fi) call when Wi-Fi calling is allowed and Wi-Fi connectivity is available to the secondary wireless device 102.-

Representative Exemplary Apparatus

FIG. 11 illustrates in block diagram format an exemplary computing device 1100 that can be used to implement the various components and techniques described herein, according to some embodiments. In particular, the detailed view of the exemplary computing device 1100 illustrates various components that can be included in the mobile wireless device 102. As shown in FIG. 11, the computing device 1100 can include one or more processors 1102 that represent microprocessors or controllers for controlling the overall operation of computing device 1100. In some embodiments, the computing device 1100 can also include a user input device 1108 that allows a user of the computing device 1100 to interact with the computing device 1100. For example, in some embodiments, the user input device 1108 can take a variety of forms, such as a button, keypad, dial, touch screen, audio input interface, visual/image capture input interface, input in the form of sensor data, etc. In some embodiments, the computing device 1100 can include a display 1110 (screen display) that can be controlled by the processor(s) 1102 to display information to the user (for example, information relating to incoming, outgoing, or active communication sessions). A data bus 1116 can facilitate data transfer between at least a storage device 1140, the processor(s) 1102, and a controller 1113. The controller 1113 can be used to interface with and control different equipment through an equipment control bus 1114. The computing device 1100 can also include a network/bus interface 1111 that couples to a data link 1112. In the case of a wireless connection, the network/bus interface 1111 can include wireless circuitry, such as a wireless transceiver and/or baseband component. The computing device 1100 can also include a secure element 1124. The secure element 1124 can include an eUICC 108.

The computing device 1100 also includes a storage device 1140, which can include a single storage or a plurality of storages (e.g., hard drives), and includes a storage management module that manages one or more partitions within the storage device 1140. In some embodiments, storage device 1140 can include flash memory, semiconductor (solid state) memory or the like. The computing device 1100 can also include a Random-Access Memory (RAM) 1120 and a Read-Only Memory (ROM) 1122. The ROM 1122 can store programs, utilities or processes to be executed in a non-volatile manner. The RAM 1120 can provide volatile data storage, and stores instructions related to the operation of the computing device 1100.

Wireless Terminology

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near-field communication (NFC), a cellular wireless network, a fourth generation (4G) LTE, LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode user equipment (UE) can be configured to prefer attachment to LTE and/or 5G wireless networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000. Evolution-Data Only (EV-DO) network, when LTE, LTE-A, and/or 5G wireless networks are otherwise unavailable.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for accessing an embedded universal integrated circuit card (eUICC) of a wireless device, the method comprising:

by a processor external to the eUICC:

receiving a request that requires access to the eUICC, wherein the eUICC is accessible through a baseband component via a first hardware interface of the eUICC and via a second hardware interface of the eUICC that is not associated with the baseband component;

when the request does not require access to the eUICC via the baseband component:

sending the request to the eUICC via the second hardware interface without booting the baseband component to a normal power state when the baseband component is in a reduced power state; and processing a result obtained from the eUICC in response to the request.

2. The method of claim 1, further comprising:

by the processor external to the eUICC:

when the baseband component of the wireless device is in the normal power state:

forwarding the request to the baseband component to communicate with the eUICC via the first hardware interface.

3. The method of claim 1, further comprising:

by the processor external to the eUICC:

when the baseband component is in the reduced power state and the request requires access via the baseband component:

booting the baseband component to the normal power state; and forwarding the request to the baseband component to communicate with the eUICC via the first hardware interface.

4. The method of claim 1, further comprising:

by the processor external to the eUICC:

when the request is sent via the second hardware interface and the result obtained from the eUICC in response to the request indicates a failure:

booting the baseband component to the normal power state;

forwarding the request to the baseband component to communicate with the eUICC via the first hardware interface; and processing a second result obtained from the eUICC in response to the request.

5. The method of claim 1, wherein the request requires access via the baseband component for an Internet Multimedia System (IMS) operation.

6. The method of claim 1, wherein the request requires access via the baseband component to perform a security sensitive personal identification number (PIN) validation.

7. The method of claim 1, wherein the request does not require access via the baseband component to authenticate a Wi-Fi call.

8. The method of claim 1, wherein the request does not require access via the baseband component to install, update, or modify an electronic subscriber identity module (eSIM) on the eUICC of the wireless device.

9. The method of claim 1, wherein the request does not require access via the baseband component to read or write an electronic file (EF) on the eUICC of the wireless device.

10. A method for accessing an embedded universal integrated circuit card (eUICC) of a secondary wireless device paired with a primary wireless device, the method comprising:

by a processor external to the eUICC:

receiving a request that requires access to the eUICC, wherein the eUICC is accessible through a baseband component via a first hardware interface of the eUICC and via a second hardware interface of the eUICC that is not associated with the baseband component;

when i) the secondary wireless device is within proximity of the primary wireless device and ii) the request does not require access to the eUICC via the baseband component:

sending the request to the eUICC via the second hardware interface without booting the baseband component to a normal power state when the baseband component is in a reduced power state; and processing a result obtained from the eUICC in response to the request.

11. The method of claim 10, further comprising:

by the processor external to the eUICC:

when the baseband component of the secondary wireless device is in the normal power state:

forwarding the request to the baseband component to communicate with the eUICC via the first hardware interface.

12. The method of claim 10, further comprising:

by the processor external to the eUICC:

when i) the baseband component is in the reduced power state, ii) the secondary wireless device is not within proximity of the primary wireless device and iii) Wi-Fi calling is not allowed or a Wi-Fi connection is not available:

booting the baseband component to the normal power state; and forwarding the request to the baseband component to communicate with the eUICC via the first hardware interface.

13. The method of claim 10, further comprising:

by the processor external to the eUICC:

when the request is sent via the second hardware interface and the result obtained from the eUICC in response to the request indicates a failure comprising an error associated with the second hardware interface:

booting the baseband component to the normal power state;

forwarding the request to the baseband component to communicate with the eUICC via the first hardware interface; and processing a second result obtained from the eUICC in response to the request.

14. The method of claim 13, wherein:

the request comprises an indication to establish a voice connection between the secondary wireless device and another wireless device;

the voice connection comprises an Internet Multimedia System (IMS) voice call; and the request requires access to the eUICC via the baseband component.

15. The method of claim 10, further comprising:

by the processor external to the eUICC:

determining whether the request requires access to the eUICC via the baseband component when the secondary wireless device is within proximity to the primary wireless device.

16. The method of claim 15, wherein the request requires access to the eUICC to establish an Internet Multimedia System (IMS) connection.

17. The method of claim 15, wherein the request does not require access to the eUICC to establish a voice over Wi-Fi call when Wi-Fi calling is allowed and Wi-Fi connectivity is available to the secondary wireless device.

18. The method of claim 10, further comprising:

by the processor external to the eUICC:

determining that the request requires access to the eUICC via the baseband component when:

i) the secondary wireless device is not within proximity to the primary wireless device, and ii) Wi-Fi calling is not allowed for the secondary wireless device, or Wi-Fi connectivity is not available to the secondary wireless device.

19. A wireless device comprising:

wireless circuitry comprising one or more antennas;

an embedded universal integrated circuit card (eUICC);

a baseband component; and a processor communicatively coupled to the wireless circuitry, to the eUICC, and to a memory storing instructions that, when executed by the processor, cause the wireless device to perform actions including:

receiving a request that requires access to the eUICC, wherein the eUICC is accessible through the baseband component via a first hardware interface of the eUICC and via a second hardware interface that is not associated with the baseband component;

when the request does not require access via the baseband component, sending the request to the eUICC via the second hardware interface without booting the baseband component to a normal power state when the baseband component is in a reduced power state; and processing a result obtained from the eUICC in response to the request.

20. The wireless device of claim 19, wherein the actions performed by the wireless device further include:

when the request is sent via the second hardware interface and the result obtained from the eUICC in response to the request indicates a failure:

booting the baseband component to the normal power state;

forwarding the request to the baseband component to communicate with the eUICC via the first hardware interface; and processing a second result obtained from the eUICC in response to the request.

* * * * *